(12) United States Patent
Kim et al.

(10) Patent No.: US 12,171,036 B2
(45) Date of Patent: *Dec. 17, 2024

(54) METHOD FOR CONTROLLING RADIO RESOURCE, AND ELECTRONIC DEVICE

(71) Applicant: Samsung Electronics Co., Ltd., Suwon-si (KR)

(72) Inventors: Hyunjung Kim, Suwon-si (KR); Suha Yoon, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/499,583

(22) Filed: Nov. 1, 2023

(65) Prior Publication Data

US 2024/0064845 A1  Feb. 22, 2024

Related U.S. Application Data

(63) Continuation of application No. 17/289,075, filed as application No. PCT/KR2019/014664 on Nov. 1, 2019, now Pat. No. 11,844,133.

(Continued)

(30) Foreign Application Priority Data

Aug. 27, 2019 (KR) .................. 10-2019-0105356

(51) Int. Cl.
*H04W 76/19* (2018.01)
*H04W 24/10* (2009.01)
(Continued)

(52) U.S. Cl.
CPC .......... *H04W 76/19* (2018.02); *H04W 24/10* (2013.01); *H04W 72/0446* (2013.01); *H04W 72/0453* (2013.01); *H04W 76/20* (2018.02)

(58) Field of Classification Search
CPC . H04W 76/19; H04W 24/10; H04W 72/0446; H04W 72/0453; H04W 76/20;
(Continued)

(56) References Cited

U.S. PATENT DOCUMENTS 11,212,669 B2 * 12/2021 Lee ..................... H04W 8/24
11,337,125 B2 *  5/2022 Kim .................... H04W 80/08
(Continued)

FOREIGN PATENT DOCUMENTS

KR  10-2013-0007737 A  1/2013

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 15), 3GPP TS 36.331 V15.3.0 (Sep. 2018), Sep. 27, 2018.

*Primary Examiner* — Brian T O Connor
(74) *Attorney, Agent, or Firm* — Jefferson IP Law, LLP

(57) ABSTRACT

A method and an apparatus for controlling a radio resource of an electronic device are disclosed. According to various embodiments of the present invention, the method can comprise the steps of: receiving, from an electronic device, an assistance information message related to overheating of the electronic device using a first radio resource; transmitting, to the electronic device, a first radio resource control (RRC) connection reconfiguration message for allocating, to the electronic device, a second radio resource that has been reduced more than the first radio resource; receiving, from the electronic device, a first RRC reconfiguration completion message as a response to the first RRC connection reconfiguration message; and transmitting, to the electronic device, a second RRC connection reconfiguration message for allocating, to the electronic device, a third radio resource that has been expanded more than the second radio resource (Continued)

at a first time point after the first RRC reconfiguration completion message has been received.

20 Claims, 13 Drawing Sheets

Related U.S. Application Data

(60) Provisional application No. 62/754,828, filed on Nov. 2, 2018.

(51) Int. Cl.
*H04W 72/0446* (2023.01)
*H04W 72/0453* (2023.01)
*H04W 76/20* (2018.01)

(58) Field of Classification Search
CPC . H04W 72/21; H04W 72/52; H04W 52/0258; H04W 52/0229; H04L 5/001; H04L 5/003; H04L 5/0094; H04L 5/0035; Y02D 30/70

See application file for complete search history.

(56) References Cited

U.S. PATENT DOCUMENTS

| | | | |
|---|---|---|---|
| 11,405,900 B2 | 8/2022 | Park et al. | |
| 11,528,597 B2* | 12/2022 | Tenny | H04W 8/24 |
| 11,533,647 B2* | 12/2022 | Wang | H04W 52/0212 |
| 11,844,133 B2* | 12/2023 | Kim | H04W 76/19 |
| 11,871,378 B2* | 1/2024 | Lee | H04W 76/19 |
| 11,917,707 B2* | 2/2024 | Da Silva | H04W 12/122 |
| 2008/0046132 A1 | 2/2008 | Dalsgaard et al. | |
| 2009/0215442 A1 | 8/2009 | Lindoff et al. | |
| 2012/0064909 A1 | 3/2012 | Lindoff et al. | |
| 2012/0142394 A1 | 6/2012 | Huan | |
| 2013/0017851 A1 | 1/2013 | Kim | |
| 2016/0157228 A1 | 6/2016 | Yum et al. | |
| 2016/0242191 A1 | 8/2016 | Liao et al. | |
| 2018/0199185 A1 | 7/2018 | Tenny et al. | |
| 2020/0100236 A1* | 3/2020 | Tenny | H04W 8/22 |

* cited by examiner

METHOD FOR CONTROLLING RADIO RESOURCE, AND ELECTRONIC DEVICE

CROSS-REFERENCE TO RELATED APPLICATION(S)

This application is a is a continuation application of prior application Ser. No. 17/289,075 filed on Apr. 27, 2021, which is a U.S. National Stage application under 35 U.S.C. § 371 of an International application number PCT/KR2019/014664, filed on Nov. 1, 2019, and claimed priority under 35 U.S.C. § 119(e) of a U.S. Provisional application Ser. No. 62/754,828 filed on Nov. 2, 2018, in United States Patent and Trademark Office, and under 35 U.S.C. § 119(a) of a Korean patent application number 10-2019-0105356 filed on Aug. 27, 2019, in the Korean Intellectual Property Office, the disclosure of each of which are incorporated by reference herein in its entirety.

TECHNICAL FIELD

The disclosure relates to a method and an electronic device for controlling radio resources.

BACKGROUND ART

In order to meet the demand for wireless data traffic soring since the 4G communication system came to the market, vigorous efforts are being made to develop enhanced 5G communication systems or pre-5G communication systems. To achieve a high data rate, 5G communication systems are considering implementation in mmWave bands other than high-frequency bands adopted for 3G and LTE systems. To mitigate pathloss on 5G communication systems and increase the reach of radio waves, the following techniques are taken into account for the 5G communication system: beamforming, massive multi-input multi-output (MIMO), full-dimensional MIMO (FD-MIMO), array antennas, analog beamforming, and large-scale antenna technology. Also being developed are various technologies for enhancing the 5G communication system network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation. There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Various ongoing attempts are being made to apply 5G communication systems to Internet-of-Things (IoT) networks. For example, the sensor network, machine-to-machine (M2M), machine type communication (MTC), or other 5G techniques are implemented by schemes, such as beamforming, multi-input multi-output (MIMO), and array antenna schemes.

Overheat attributed to use of ultra-high frequency bands may be more likely in 5G communication electronic devices than in pre-5G communication electronic devices. Thus, a need may arise for technology capable of controlling the radio resources of electronic devices for seamless communication of electronic devices in a 5G communication network.

DETAILED DESCRIPTION OF THE INVENTION

Technical Problem

The electronic device may request the base station to reset reduced radio resources to eliminate overheating, and the electronic device may request the base station to reset increased radio resources after overheating is relieved. Conventional methods have a problem in that the base station cannot reset increased radio resource for the electronic device unless the electronic device requests the base station to reset increased radio resources. This may deteriorate the user experience.

According to various embodiments of the present invention, there are provided a device and method for resetting increased radio resources for an electronic device by a base station, even when the electronic device does not request the base station to reset increased radio resources in a communication system including a 5G communication system. Thus, the base station may more efficiently control radio resources of the electronic device that overheats.

Technical Solution

According to various embodiments of the present invention, a method for controlling a radio resource for communication with an electronic device by a base station may comprise receiving an assistance information message related to an overheating of the electronic device using a first radio resource from the electronic device, transmitting, to the electronic device, a first radio resource control (RRC) connection reconfiguration message for allocating a second radio resource, which is reduced as compared with the first radio resource, to the electronic device in response to the assistance information message, receiving a first RRC reconfiguration complete message from the electronic device in response to the first RRC connection reconfiguration message, and transmitting, to the electronic device, a second RRC connection reconfiguration message for allocating a third radio resource, which is increased as compared with the second radio resource, to the electronic device at a first time point after receiving the first RRC reconfiguration complete message.

According to various embodiments of the present invention, a method for communicating with a base station based on a radio resource by an electronic device may comprise transmitting an assistance information message related to an overheating of the electronic device using a first radio resource to the base station, receiving, from the base station, a first radio resource control (RRC) connection reconfiguration message related to a second radio resource reduced as compared with the first radio resource, transmitting a first RRC reconfiguration complete message to the base station in response to the first RRC connection reconfiguration message, and receiving, from the base station, a second RRC connection reconfiguration message related to a third radio resource increased as compared with the second radio resource.

According to various embodiments of the present invention, a base station configured to control a radio resource for communication with an electronic device may comprise a transceiver, and at least one processor connected with the transceiver. The at least one processor may be configured to receive an assistance information message related to an overheating of the electronic device using a first radio resource from the electronic device, transmit, to the electronic device, a first radio resource control (RRC) connection reconfiguration message for allocating a second radio resource, which is reduced as compared with the first radio resource, to the electronic device in response to the assistance information message, receive, from the electronic device, a first RRC reconfiguration complete message in response to the first RRC connection reconfiguration message, and transmit, to the electronic device, a second RRC connection reconfiguration message for allocating a third radio resource, which is increased as compared with the second radio resource, to the electronic device at a first time point after receiving the first RRC reconfiguration complete message.

According to various embodiments of the present invention, an electronic device configured to communicate with a base station based on a radio resource may comprise a transceiver, and at least one processor connected with the transceiver. The at least one processor may be configured to transmit an assistance information message related to an overheating of the electronic device using a first radio resource to the base station, receive, from the base station, a first radio resource control (RRC) connection reconfiguration message related to a second radio resource reduced as compared with the first radio resource, transmit a first RRC reconfiguration complete message to the base station in response to the first RRC connection reconfiguration message, and receive, from the base station, a second RRC connection reconfiguration message related to a third radio resource increased as compared with the second radio resource.

Advantageous Effects

According to various embodiments of the present invention, there may be provided an electronic device and method capable of efficiently controlling radio resources when overheating occurs. There may also be provided a method for allowing the base station to more efficiently control the radio resources of the electronic device by periodically monitoring whether the electronic device is overheated and determining whether to change the radio resource allocated to the electronic device.

MODE FOR CARRYING OUT THE INVENTION

Hereinafter, embodiments of the present invention are described in detail with reference to the accompanying drawings. The embodiments described herein are provided merely for illustration purposes but should not be interpreted as limiting the scope of the disclosure. Any other embodiments that one of ordinary skill in the art would readily infer or elicit from the embodiments set forth herein should also be interpreted as belonging to the scope of the disclosure.

When an element "includes" another element, the element may further include the other element, rather excluding the other element, unless particularly stated otherwise.

In embodiments of the present invention, when an element is "connected" with another element, the element may be "directly connected" with the other element, or the element may be "electrically connected" with the other element via an intervening element.

Further, the terms "unit," "module," or "part" as used herein denote a unit processing at least one function or operation, and a unit, module, or part may be implemented in hardware, software, or a combination thereof.

Figure 1:
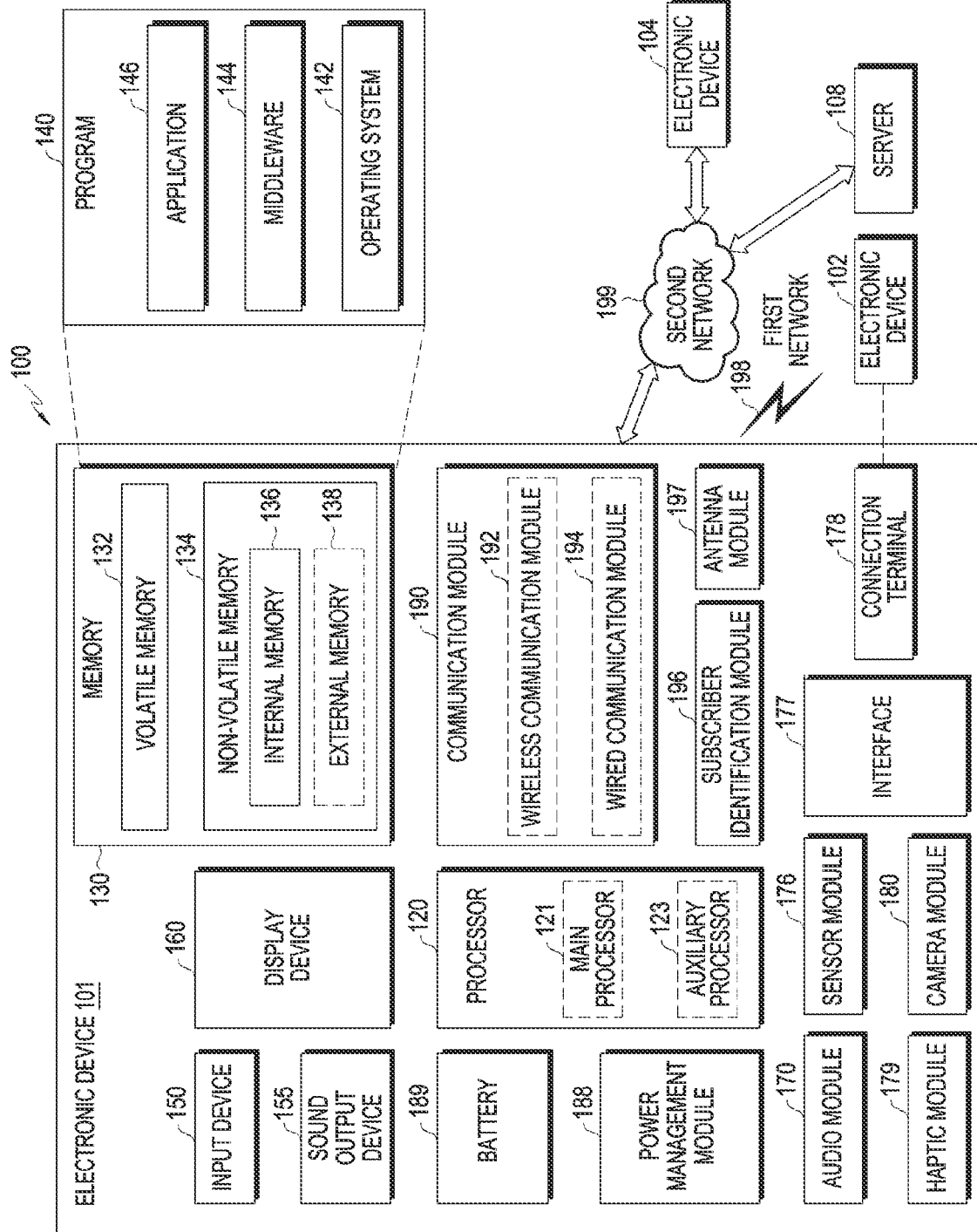
FIG. 1 is a block diagram illustrating an electronic device in a network environment according to various embodiments of the present invention.

FIG. 1 is a block diagram illustrating an electronic device in a network environment according to various embodiments of the present invention. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
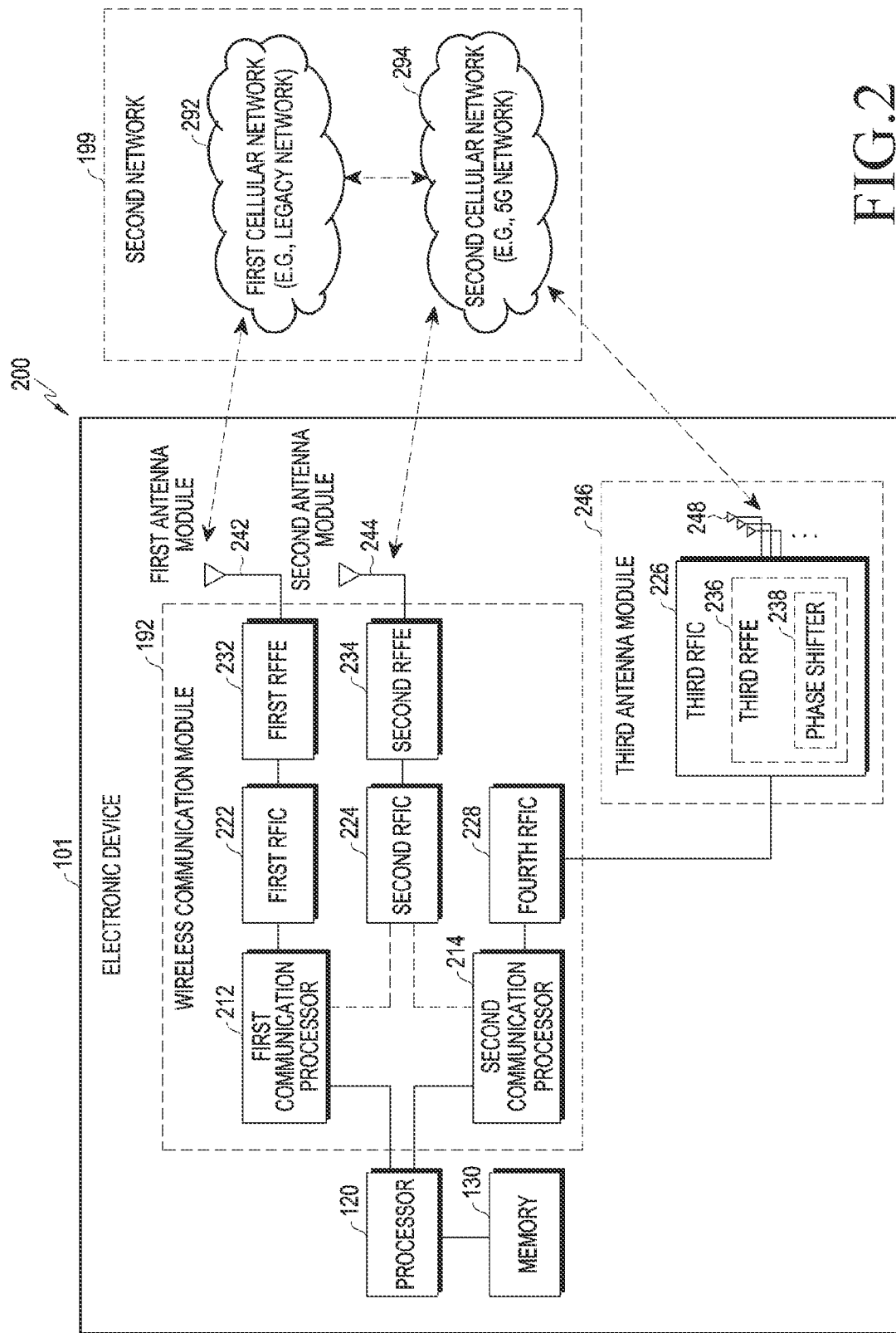
FIG. 2 is a block diagram illustrating an electronic device in a network environment including a plurality of cellular networks according to various embodiments of the present invention.

FIG. 2 is a block diagram illustrating an electronic device in a network environment including a plurality of cellular networks according to various embodiments of the present invention. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The second network 199 may include a first cellular network 292 and a second cellular network 294. According to an embodiment, the electronic device 101 may further include at least one component among the components of FIG. 1, and the second network 199 may further include at least one other network. According to an embodiment, the first communication processor (CP) 212, the second CP 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted or be included as part of the third RFIC 226.

The first CP 212 may establish a communication channel of a band that is to be used for wireless communication with the first cellular network 292 or may support legacy network communication via the established communication channel. According to an embodiment, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel. According to an embodiment, the first CP 212 and the second CP 214 may be implemented in a single chip or a single package. According to an embodiment, the first CP 212 or the second CP 214, along with the processor 120, an assistance processor 123, or communication module 190, may be formed in a single chip or single package. According to an embodiment, the first CP 212 and the second CP 214 may be connected together directly or indirectly by an interface (not shown) to provide or receive data or control signals unilaterally or bi-laterally.

Upon transmission, the first RFIC 222 may convert a baseband signal generated by the first CP 212 into a radio frequency (RF) signal with a frequency ranging from about 700 MHz to about 3 GHz which is used by the first cellular network 292 (e.g., a legacy network). Upon receipt, the RF signal may be obtained from the first cellular network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first CP 212.

Upon transmission, the second RFIC 224 may convert the baseband signal generated by the first CP 212 or the second CP 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first CP 212 and the second CP 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second CP 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second CP 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second CP 214.

According to an embodiment, the first RFIC 222 and the second RFIC 224 may be implemented as at least part of a single chip or single package. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second cellular network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first CP 212, or the second CP 214).

Figure 3:
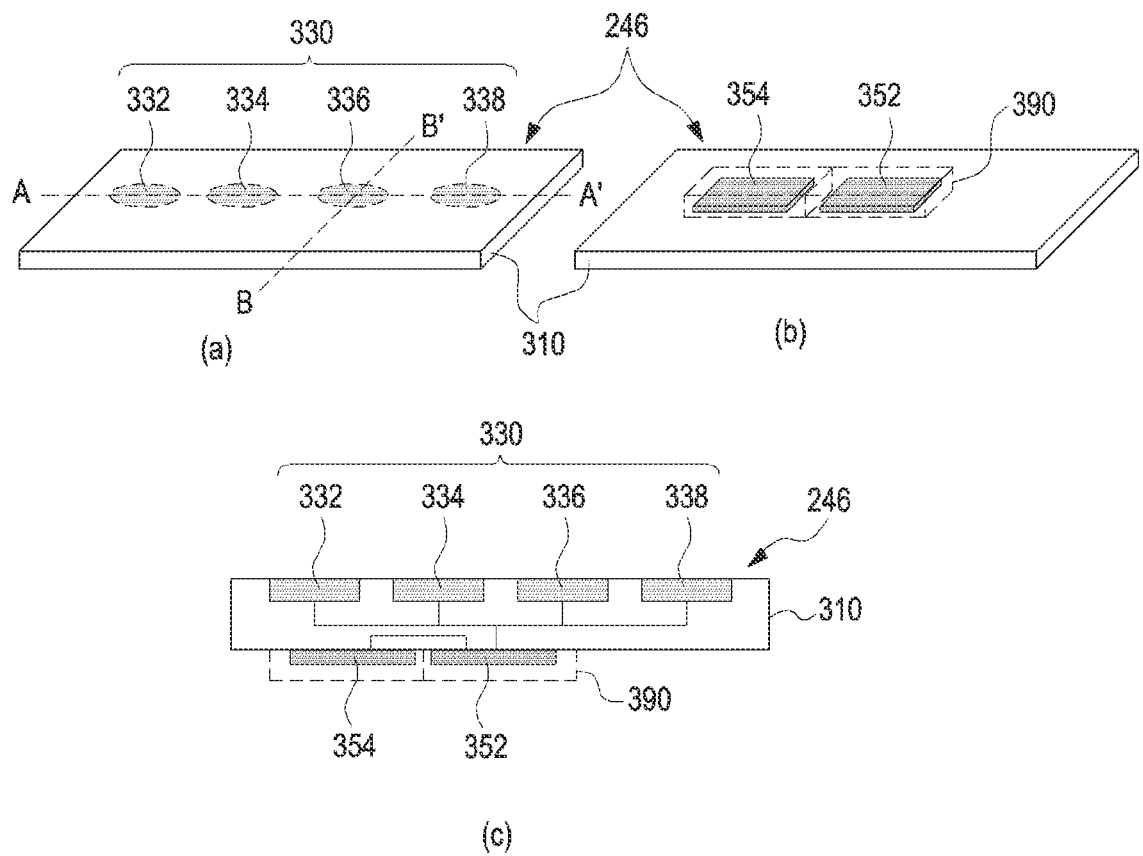
FIG. 3 illustrates a structure of an antenna module according to various embodiments of the present invention.

FIG. 3 illustrates a structure of an antenna module according to various embodiments of the present invention. FIG. 3 illustrates an embodiment of a structure of the third antenna module 246 described above in connection with FIG. 2. FIG. 3A is a perspective view of the third antenna module 246 as viewed from one side, and FIG. 3B is a perspective view of the third antenna module 246 as viewed from another side. FIG. 3C is a cross-sectional view of the third antenna module 246 taken along line A-A'.

Referring to FIG. 3, according to an embodiment, the third antenna module 246 may include a printed circuit board 310, an antenna array 330, a radio frequency integrated circuit (RFIC) 352, a power management integrated circuit (PMIC) 354, and a module interface 370. Selectively, the third antenna module 246 may further include a shielding member 390. According to an embodiment, at least one of the above-mentioned components may be omitted, or at least two of the components may be integrally formed with each other.

The printed circuit board 310 may include a plurality of conductive layers and a plurality of non-conductive layers alternately stacked with the conductive layers. Electronic components arranged on, or outside of, the printed circuit board 310 may be electrically connected together via wires and conductive vias formed on or through the conductive layers.

The antenna array 330 (e.g., 248 of FIG. 2) may include a plurality of antenna elements 332, 334, 336, or 338 arranged to form directional beams. The antenna elements may be formed on a first surface of the printed circuit board 310 as shown. Alternatively, the antenna array 330 may be formed inside the printed circuit board 310. According to an embodiment, the antenna array 330 may include a plurality of antenna arrays (e.g., a dipole antenna array and/or a patch antenna array) of the same or different shapes or kinds.

The RFIC 352 (e.g., 226 of FIG. 2) may be disposed in another area (e.g., a second surface opposite to the first surface) of the printed circuit board 310 which is spaced apart from the antenna array. The RFIC is configured to be able to process signals of a selected frequency band which are transmitted or received via the antenna array 330. According to an embodiment, upon transmission, the RFIC 352 may convert a baseband signal obtained from a CP (not shown) into a designated band of RF signal. Upon receipt, the RFIC 352 may transfer the RF signal received via the antenna array 352 into a baseband signal and transfer the baseband signal to the CP.

According to another embodiment, upon transmission, the RFIC 352 may up-convert an IF signal (e.g., ranging from about 9 GHz to about 11 GHz) obtained from the intermediate frequency integrated circuit (IFIC) (e.g., 228 of FIG. 2) into a selected band of RF signal. Upon receipt, the RFIC 352 may down-convert the RF signal obtained via the antenna array 352 into an IF signal and transfer the IF signal to the IFIC.

The PMIC 354 may be disposed in another portion (e.g., the second surface) of the printed circuit board 310 which is spaced apart from the antenna array. The PMIC may receive a voltage from a main printed circuit board (not shown) and provide necessary power to various components (e.g., the RFIC 352) on the antenna module.

The shielding member 390 may be disposed in a portion (e.g., the second surface) of the printed circuit board 310 to electromagnetically shield off at least one of the RFIC 352 or the PMIC 354. According to an embodiment, the shielding member 390 may include a shield can.

Although not shown, the third antenna module 246 may be electrically connected with another printed circuit board (e.g., the main printed circuit board) via the module interface. The module interface may include a connecting member, e.g., a coaxial cable connector, board-to-board connector, interposer, or FPCB. The RFIC 352 and/or the PMIC 354 may be electrically connected with the printed circuit board via the connecting member.

Figure 4A:
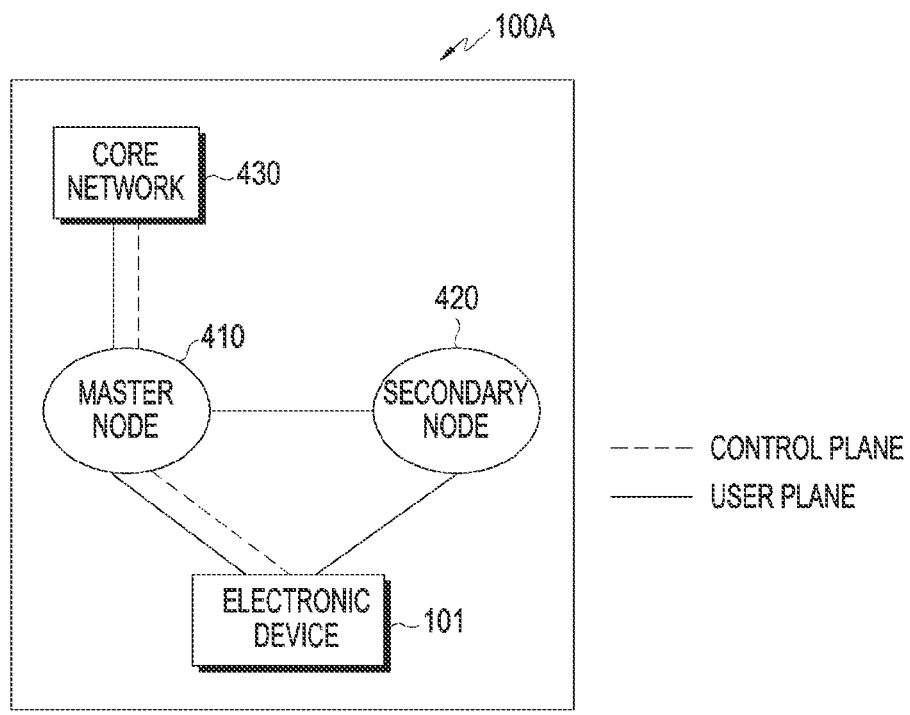
FIGS. 4A, 4B, and 4C are views illustrating wireless communication systems providing at least one of a network for legacy communication and a network for 5G communication according to various embodiments of the present invention.
Figure 4B:
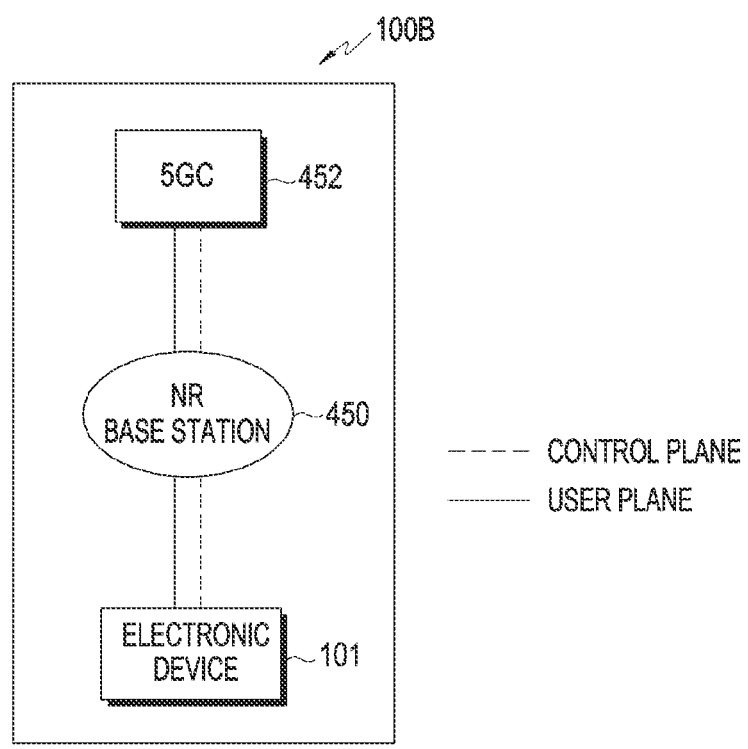
Figure 4C:
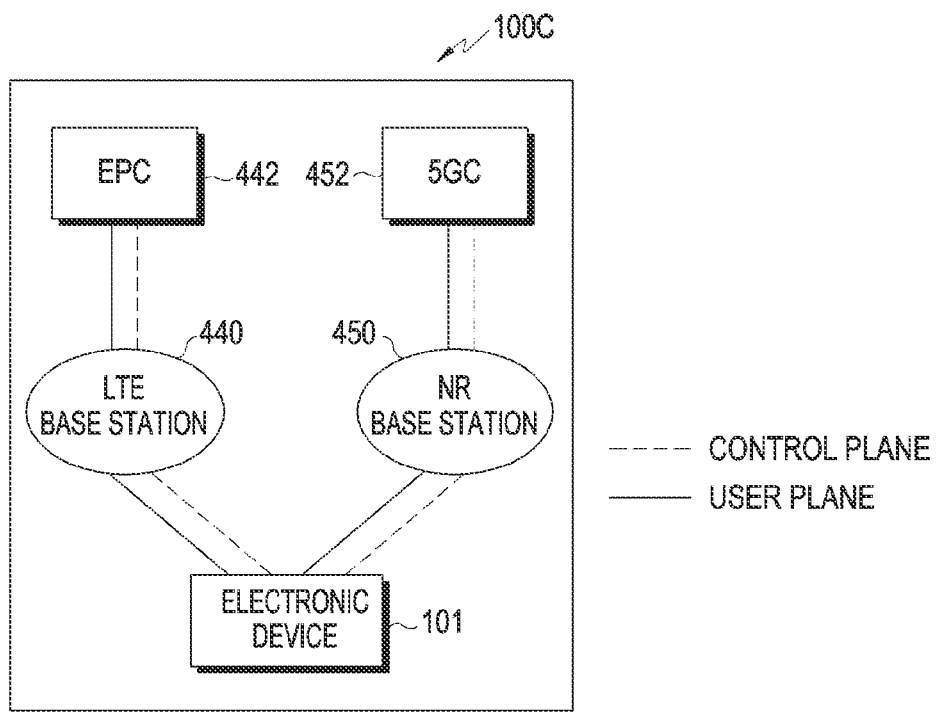

FIGS. 4a, 4b, and 4c are views illustrating wireless communication systems providing at least one of a network for legacy communication and a network for 5G communication according to various embodiments of the present invention. Referring to FIGS. 4a, 4b, and 4c, the network environments 100A to 100C may include at least one of a legacy network and a 5G network. The legacy network may include, e.g., a 3GPP-standard 4G or LTE base station 450 (e.g., an eNodeB (eNB)) that supports radio access with the electronic device 101 and an evolved packet core (EPC) 451 that manages 4G communication. The 5G network may include, e.g., a new radio (NR) base station 450 (e.g., a gNodeB (gNB)) that supports radio access with the electronic device 101 and a 5th generation core (5GC) 452 that manages 5G communication for the electronic device 101.

According to various embodiments, the electronic device 101 may transmit or receive control messages and user data via legacy communication and/or 5G communication. The control messages may include, e.g., messages related to at least one of security control, bearer setup, authentication, registration, or mobility management for the electronic device 101. The user data may mean, e.g., user data except for control messages transmitted or received between the electronic device 101 and the core network 430 (e.g., the EPC 442).

Referring to FIG. 4A, according to an embodiment, the electronic device 101 may transmit or receive at least one of a control message or user data to/from at least part (e.g., the NR base station 450 or 5GC 452) of the 5G network via at least part (e.g., the LTE base station 440 or EPC 442) of the legacy network.

According to an embodiment, the network environment 100A may control a network environment that provides multi-radio access technology (RAT) dual connectivity (MR-DC) to the LTE base station 440 and the NR base station 450 and transmits or receives control messages to/from the electronic device 101 via the core network 430 of one of the EPC 442 or the 5GC 452.

According to an embodiment, in the MR-DC environment, one of the LTE base station 440 or the NR base station 450 may operate as a master node (MN) 410, and the other as a secondary node (SN) 420. The MN 410 may be connected with the core network 430 to transmit or receive control messages. The MN 410 and the SN 420 may be connected with each other via a network interface to transmit or receive messages related to radio resource (e.g., communication channel) management therebetween.

According to an embodiment, the MN 410 may include the LTE base station 440, the SN 420 may include the NR base station 450, and the core network 430 may include the EPC 442 (e.g., E_UTRA NR dual connectivity (EN-DC)). For example, the electronic device 101 may transmit or receive control messages via the LTE base station 440 and the EPC 442 and may transmit or receive user data via the LTE base station 440 and the NR base station 450.

Alternatively, the MN 410 may include the NR base station 450, the SN 420 may include the LTE base station 440, and the core network 430 may include the 5GC 452 (e.g., NR E_UTRA NR dual connectivity (NE-DC)). For example, the electronic device 101 may transmit or receive control messages through the NR base station 450 and the 5GC 452 and may transmit or receive user data via the LTE base station 440 and the NR base station 450.

Referring to FIG. 4B, according to various embodiments, the 5G network may transmit or receive control messages and user data independently from the electronic device 101.

Referring to FIG. 4C, according to an embodiment, the legacy network and the 5G network each may provide data transmission/reception independently. For example, the electronic device 101 and the EPC 442 may transmit or receive control messages and user data via the LTE base station 450. As another example, the electronic device 101 and the 5GC 452 may transmit or receive control messages and user data via the NR base station 450.

According to an embodiment, the electronic device 101 may be registered in at least one of the EPC 442 or the 5GC 452 to transmit or receive control messages.

According to an embodiment, the EPC 442 or the 5GC 452 may interwork with each other to manage communication for the electronic device 101. For example, mobility information for the electronic device 101 may be transmitted or received via the interface between the EPC 442 and the 5GC 452.

Figure 5:
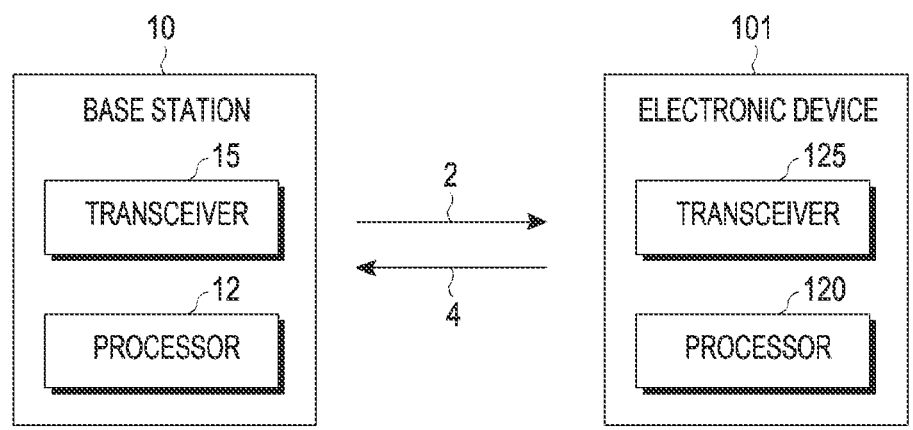
FIG. 5 illustrates a wireless communication system according to various embodiments of the present invention.

FIG. 5 illustrates a wireless communication system according to various embodiments of the present invention. Referring to FIG. 5, the wireless communication system may include a base station (or a cell) 10 and an electronic device 101.

According to an embodiment, the base station 10 may wirelessly communicate with the electronic device 101 via one or more base station antennas. For example, the base station 10 and the electronic device 101 may communicate with each other via a downlink (DL) channel 2 and an uplink (UL) channel 4. The wireless communication network between the base station 10 and the electronic device 101 may support communication by multiple users by sharing available network resources. For example, information may be transferred over the wireless communication network in various schemes, such as code division multiple access (CDMA), frequency division multiple access (FDMA), time division multiple access (TDMA), orthogonal frequency division multiple access (OFDMA), or single carrier frequency division multiple access (SC-FDMA).

Although one base station 10 is shown in the figures, this is merely for ease of description, and the wireless communication system may rather include one or more base stations 10. The wireless communication system may include different types of base stations (e.g., macro, micro, and/or pico base stations).

According to an embodiment, the base station 10 may provide communication coverage for a predetermined geographical area. As an example, the base station 10 may also be termed, e.g., base transceiver station (BTS), radio base station, access point (AP), radio frequency, NodeB, eNodeB (eNB), gNodeB (gNB), home nodeB, home eNodeB, or be named in other adequate terms.

According to an embodiment, the electronic device 101, as a wireless communication device, may be stationary or mobile and may collectively denote various devices capable of transmitting or receiving data and/or control information via communication with the base station 10. For example, the electronic device 101 may be termed terminal equipment, mobile station (MS), mobile terminal (MT), user terminal (UT), subscribe station (SS), wireless device, or handheld device. For example, the electronic device 101 may be a constituent apparatus of an IoT network, and the functionality of the apparatus is not limited to communication with the base station.

According to various embodiments of the present invention, the base station 10 may include a transceiver 15. The transceiver 15 may perform various functions related to the radio interface between the base station 10 and the electronic device 101. For example, the transceiver 15 may transmit a signal to the electronic device 101 and receive a signal from the electronic device 101. According to an embodiment, the transceiver 15 may be configured to modulate transmitting signals and/or demodulate signals received from the electronic device 101 or to perform various communication functions, e.g., encoding or decoding, necessary for communication with the electronic device 101.

According to various embodiments of the present invention, the base station 10 may include a processor 12. For example, the processor 12 may include one or more processors. In an exemplary embodiment, when the processor 12 includes a plurality of processors, the processor 12 may include an application processor (AP) and a communication processor (CP).

In an exemplary embodiment, the processor 12 may control the transceiver 15 to receive an assistance information message from the electronic device 101. In an exemplary embodiment, the processor 12 may determine a second radio resource allocated to the electronic device 101. In an exemplary embodiment, the processor 12 may control the transceiver 15 to transmit a first radio resource control (RRC) connection reconfiguration message for allocating the second radio resource to the electronic device 101 to the electronic device 101. In an exemplary embodiment, the processor 12 may control the transceiver 15 to receive a first RRC reconfiguration complete message from the electronic device 101. In an exemplary embodiment, the processor 12 may control the transceiver 15 to transmit a second RRC connection reconfiguration message for allocating a third radio resource to the electronic device 101 at a first time point to the electronic device 101.

According to various embodiments of the present invention, the electronic device 101 may include a transceiver 125. The transceiver 125 may perform various functions related to the radio interface between the base station 10 and the electronic device 101. For example, the transceiver 125 may transmit signals to the base station 10 and receive signals from the base station 10. According to an embodiment, the transceiver 125 may be configured to modulate transmitting signals and/or demodulate signals received from the base station 10 or to perform various communication functions, e.g., encoding or decoding, necessary for communication with the base station 10.

According to various embodiments of the present invention, the electronic device 101 may include a processor 120. For example, the processor 120 may include one or more processors. In an exemplary embodiment, when the processor 120 includes a plurality of processors, the processor 120 may include an application processor (AP) and a communication processor (CP).

In an exemplary embodiment, the processor 120 may generate an assistance information message in response to identifying the overheating of the electronic device 101. For example, the assistance information message may include information on the second radio resource. In an exemplary embodiment, the processor 120 may control the transceiver 125 to transmit an assistance information message to the base station 10. In an exemplary embodiment, the processor 120 may control the transceiver 125 to receive a first radio resource control (RRC) connection reconfiguration message from the base station 10. In an exemplary embodiment, the processor 120 may control the transceiver 125 to transmit the first RRC reconfiguration complete message to the base station 10. In an exemplary embodiment, the processor 120 may control the transceiver 125 to receive a second RRC connection reconfiguration message from the base station 10. In an exemplary embodiment, the processor 120 may identify whether the overheating of the electronic device 101 is relieved in response to the second RRC connection reconfiguration message.

Figure 6:
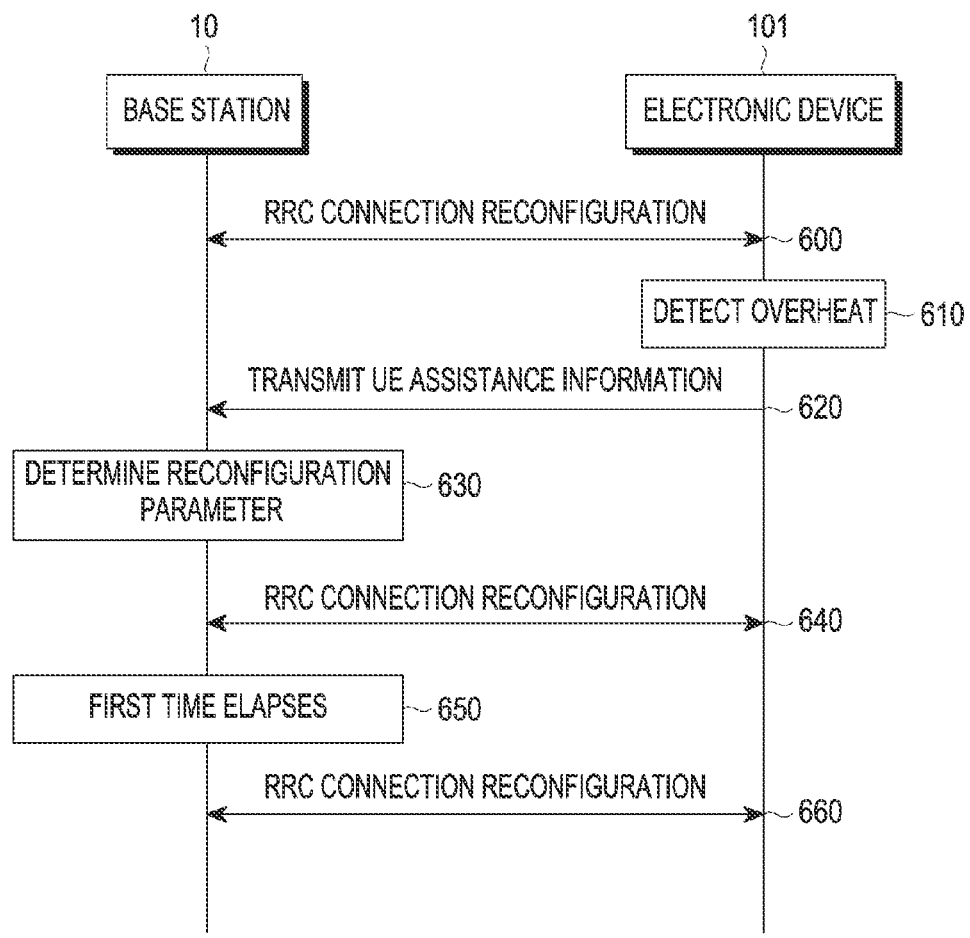
FIG. 6 is a view illustrating an example of transmission/reception of signals between an electronic device and a base station according to various embodiments of the present invention.

FIG. 6 is a view illustrating an example of transmission/reception of signals between an electronic device and a base station according to various embodiments of the present invention.

Referring to FIG. 6, in operation 600, the base station 10 and the electronic device 101 (e.g., at least one of the processor 120 or the at least one communication processor 212 and 214) according to various embodiments may reconfigure a radio resource control (RRC) connection (RRC reconfiguration). For example, the base station 10 may allocate a first radio resource to the electronic device 101 through the RRC connection reconfiguration of operation 600. For example, the electronic device 101 may be configured to use the first radio resource according to the RRC connection reconfiguration of operation 600.

According to various embodiments, in operation 610, the electronic device 101 may detect an overheating condition. For example, the electronic device 101 may identify the overheating of the electronic device 101. The electronic device 101 may include at least one temperature sensor capable of measuring the temperature at at least one point of the electronic device 101 (e.g., a point near an AP or a point near the battery) and identify whether the electronic device 101 is overheated based on the sensing value from the sensor. In various embodiments, the electronic device 101 may identify whether the electronic device 101 is overheated based on whether the sensing value from any one temperature sensor exceeds a threshold, but this is merely an example, and the electronic device 101 may identify whether overheating occurs based on the temperature sensing values at multiple points. For example, the electronic device 101 may generate an assistance information message in response to identifying the overheating of the electronic device 101. For example, the assistance information message may include UE assistance information (UEAssistanceInformation).

In an exemplary embodiment, the UE assistance information (UEAssistanceInformation) may include the capability of the electronic device 101 that the electronic device 101 may reduce. In an exemplary embodiment, the capability of the electronic device 101 that may be reduced by the electronic device 101 may correspond to the second radio resource. For example, the capability of the electronic device 101 that may be reduced by the electronic device 101 may be the number of component carriers (CCs) on which the electronic device 101 operates. For example, the capability of the electronic device 101 that may be reduced by the electronic device 101 may be a maximum bandwidth of a frequency range in which the electronic device 101 operates. For example, the capability of the electronic device 101 that the electronic device 101 may reduce may be the maximum multiple input multiple output layers (e.g., MIMO layers, MIMO rank) in the frequency range in which the electronic device 101 operates. The maximum multiple input multiple output layers in the frequency range may mean the number of maximum multiple input multiple output ranks that may be set for each terminal or each component carrier (CC).

According to various embodiments, in operation 620, the electronic device 101 may transmit the UE assistance information (UEAssistanceInformation) generated in response to identifying the overheating of the electronic device 101 to the base station 10.

According to various embodiments, in operation 630, the base station 10 may determine a reconfiguration parameter for the electronic device 101. In an exemplary embodiment, the base station 10 receiving the UE assistance information (UEAssistanceInformation) may determine whether to accept or ignore a request of the electronic device 101 corresponding to the UE assistance information (UEAssistanceInformation). In an exemplary embodiment, when the base station 10 accepts the request of the electronic device 101 corresponding to the UE assistance information (UEAssistanceInformation), the base station 10 may identify the UE assistance information (UEAssistanceInformation) and determine the reconfiguration parameter for the resource configured in the electronic device 101 with a second radio resource corresponding to the UE assistance information (UEAssistanceInformation).

In an exemplary embodiment, the second radio resource may be a reduced resource as compared with the first radio resource. For example, the second radio resource may have a smaller maximum bandwidth in a frequency range in which the electronic device 101 operates than the first radio resource. For example, the second radio resource may have fewer multiple input multiple output layers (e.g., MIMO layers, MIMO rank) of the frequency range in which the electronic device 101 operates than the first radio resource. For example, the second radio resource may have fewer component carriers (CCs) than the first radio resource.

According to various embodiments, in operation 640, the base station 10 and the electronic device 101 may reconfigure (RRC reconfiguration) a radio resource control (RRC) connection. For example, the base station 10 may allocate a second radio resource to the electronic device 101 through the RRC connection reconfiguration of operation 640. For example, the electronic device 101 may be configured to use the second radio resource according to the RRC connection reconfiguration of operation 640.

In an exemplary embodiment, in operation 640, the base station 10 may transmit a first RRC connection reconfiguration message to the electronic device 101. For example, the first RRC connection reconfiguration message may include information on the second radio resource allocated to the electronic device 101.

In an exemplary embodiment, in operation 640, the electronic device 101 may transmit the first RRC reconfiguration complete message to the base station 10. For example, the first RRC reconfiguration complete message may correspond to a response to the first RRC connection reconfiguration message received from the base station 10 by the electronic device 101. For example, the first RRC reconfiguration complete message may include information on the second radio resource.

In an exemplary embodiment, when the base station 10 receives the first RRC reconfiguration complete message from the electronic device 101, the base station 10 may determine that the electronic device 101 uses the second radio resource.

According to various embodiments, in operation 650, the base station 10 may identify a first time point that passes by a first time from the start time of the first time. In an exemplary embodiment, the start time of the first time may be a time point when the base station 10 receives UE assistance information (UEAssistanceInformation) from the electronic device 101 in operation 620. In an exemplary embodiment, the start time of the first time may be a time point when the base station 10 determines a reconfiguration parameter for the electronic device 101 in operation 630.

In an exemplary embodiment, the first time may be determined considering a cooling method of the electronic device 101. For example, the cooling method of the electronic device 101 may include an air cooling type, a water cooling type, and a fan type.

In an exemplary embodiment, the first time may be determined considering the type of the electronic device 101. In an exemplary embodiment, the time required for the electronic device 101 to relieve overheating may vary according to the type of the electronic device 101. For example, the types of the electronic device 101 may include a smartphone, a tablet, a PC, and a CPE. For example, for the same type of electronic device 101, the first time may be determined to differ according to the terminal model or the terminal manufacturer.

In an exemplary embodiment, the first time may be determined to differ according to the first radio resource used by the electronic device 101. In an exemplary embodiment, the time required for the electronic device 101 to relieve overheating may vary according to the first radio resource used by the electronic device 101. For example, the first time may be determined to differ according to the frequency corresponding to the first radio resource used by the electronic device 101. For example, the first time may be determined to differ according to the bandwidth corresponding to the first radio resource used by the electronic device 101. For example, the first time may be determined to differ according to the number of carriers corresponding to the first radio resource used by the electronic device 101.

In an exemplary embodiment, the first time may be determined to differ according to the second radio resource used by the electronic device 101. In an exemplary embodiment, the time required for the electronic device 101 to relieve overheating may vary according to the second radio resource used by the electronic device 101. For example, the first time may be determined to differ according to the frequency corresponding to the second radio resource used by the electronic device 101. For example, the first time may be determined to differ according to the bandwidth corresponding to the second radio resource used by the electronic device 101. For example, the first time may be determined to differ according to the number of carriers corresponding to the second radio resource used by the electronic device 101.

According to various embodiments, in operation 660, the base station 10 and the electronic device 101 may reconfigure (RRC reconfiguration) a radio resource control (RRC) connection, based on the first time being identified to have elapsed. For example, the base station 10 may allocate a third radio resource to the electronic device 101 through the RRC connection reconfiguration of operation 660. For example, the electronic device 101 may be configured to use the third radio resource according to the RRC connection reconfiguration of operation 660.

In an exemplary embodiment, in operation 660, the base station 10 may transmit a second RRC connection reconfiguration message to the electronic device 101. For example, the second RRC connection reconfiguration message may include information on the third radio resource allocated to the electronic device 101.

In an exemplary embodiment, the third radio resource may be an increased resource as compared with the second radio resource. For example, the third radio resource may have a larger maximum bandwidth in a frequency range in which the electronic device 101 operates than the second radio resource. For example, the third radio resource may have more multiple input multiple output layers (e.g., MIMO layers, MIMO rank) of the frequency range in which the electronic device 101 operates than the second radio resource.

Figure 7:
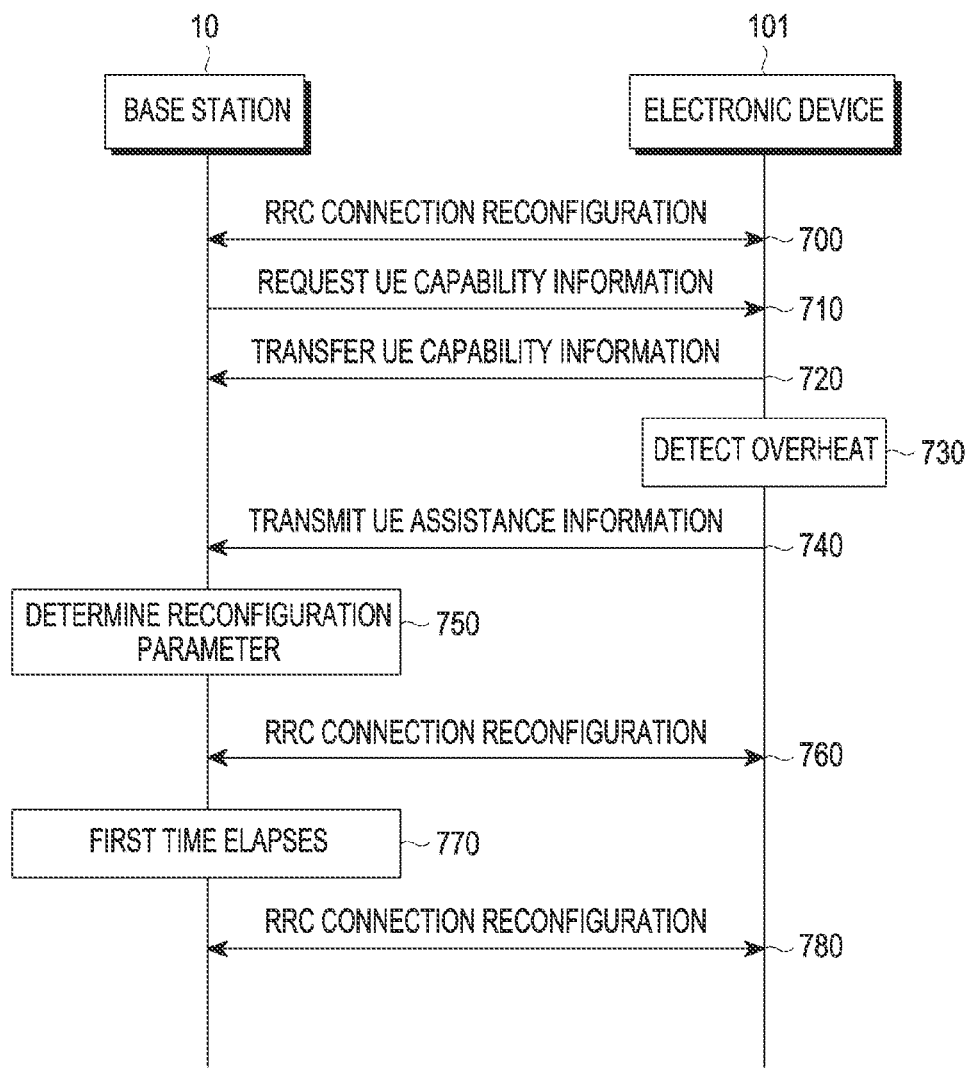
FIG. 7 is a view illustrating an example of transmission/reception of signals between an electronic device and a base station according to various embodiments of the present invention.

FIG. 7 is a view illustrating an example of transmission/reception of signals between an electronic device and a base station according to various embodiments of the present invention. Some (operations 700 and 730 to 780) of the operations (operations 700 to 780) illustrated in FIG. 7 are the same as operations (operations 600 to 660) illustrated in FIG. 6. That is, operations 700, 730, 740, 750, 760, 770, and 780 in FIG. 7 may respectively correspond to operations 600, 610, 620, 630, 640, 650 and 660 in FIG. 6. Accordingly, a detailed description of the same operations as those in FIG. 6 among the operations in FIG. 7 will be omitted.

Referring to FIG. 7, the base station 10, according to various embodiments, may reconfigure an RRC connection with the electronic device 101 (operation 700, corresponding to operation 600 in FIG. 6) and then receive information on capability (UECapabilityInformation) from the electronic device 101.

According to various embodiments, the base station 10 may send a request for capability information (UECapabilityInformation) on the electronic device 101 to the electronic device 101 (e.g., at least one of the processor 120 or the at least one communication processor 212 and 214) in operation 710. For example, the base station 10 may transmit a message (UECapabilityEnquiry) requesting information on the capability of the electronic device 101 to the electronic device 101.

According to various embodiments, in operation 720, the electronic device 101 may transfer the information on the capability of the electronic device 101 (UECapabilityInformation) to the base station 10. For example, the information (UECapabilityInformation) on the capability of the electronic device 101 may include information on a cooling method of the electronic device 101. For example, the cooling method of the electronic device 101 may include an air cooling type, a water cooling type, and a fan type. For example, the information (UECapabilityInformation) on the capability of the electronic device 101 may include information on the type of the electronic device 101. For example, the types of the electronic device 101 may include a smartphone, a tablet, a PC, and a CPE. For example, the information (UECapabilityInformation) on the capability of the electronic device 101 may include information on the terminal model or manufacturer of the electronic device 101.

In an exemplary embodiment, the electronic device 101 does not receive a message for requesting the information (UECapabilityInformation) on the capability of the electronic device 101 by the base station 10 and, in operation 720, may transfer the information (UECapabilityInformation) on the capability of the electronic device 101 to the base station 10.

In an exemplary embodiment, the electronic device 101 receives a message for requesting the information (UECapabilityInformation) on the capability of the electronic device 101 by the base station 10 in operation 710 and, in operation 720, may transfer the information (UECapabilityInformation) on the capability of the electronic device 101 to the base station in response thereto.

Figure 8:
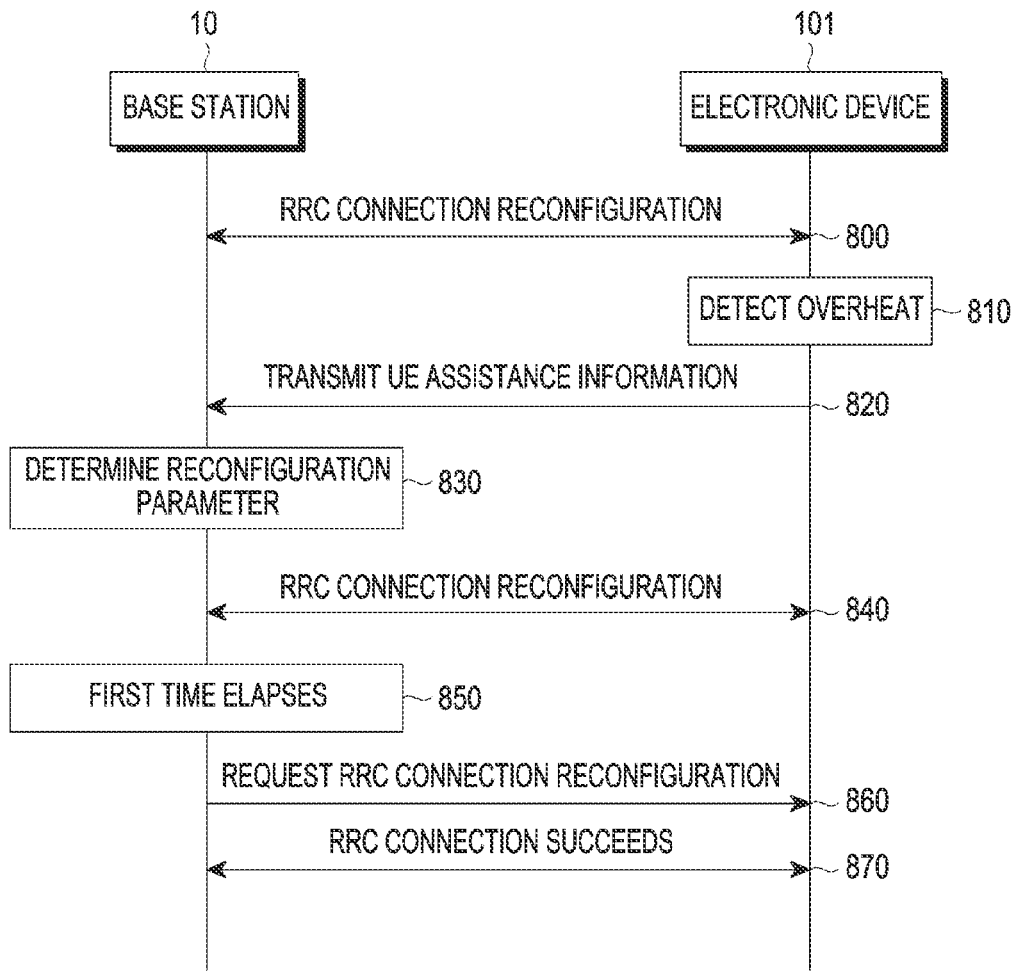
FIG. 8 is a view illustrating an example of transmission/reception of signals between an electronic device and a base station according to various embodiments of the present invention.

FIG. 8 is a view illustrating an example of transmission/reception of signals between an electronic device and a base station according to various embodiments of the present invention. Some (operations 800 to 850) of the operations (operations 800 to 870) illustrated in FIG. 8 are the same as operations (operations 600 to 650) illustrated in FIG. 6. That is, operations 800, 810, 820, 830, 840, and 850 in FIG. 8 may respectively correspond to operations 600, 610, 620, 630, 640, and 650 in FIG. 6. Accordingly, a detailed description of the same operations as those in FIG. 6 among the operations in FIG. 8 will be omitted.

Referring to FIG. 8, when the base station 10 according to various embodiments identifies that the first time elapses in operation 850 (corresponding to operation 650 in FIG. 6), the base station 10 may transmit, to the electronic device 101, a second RRC connection reconfiguration message for configuring an RRC connection with the electronic device 101 (e.g., at least one of the processor 120 or at least one communication processor 212 or 214) in operation 860. For example, the second RRC connection reconfiguration message may include information on the third radio resource allocated to the electronic device 101.

In an exemplary embodiment, in operation 870, the base station 10 and the electronic device 101 may reconfigure the RRC connection. For example, the electronic device 101 may transmit a second RRC reconfiguration complete message to the base station 10 in response to the received second RRC connection reconfiguration message. For example, the second RRC reconfiguration complete message may include information on the third radio resource. For example, the second RRC reconfiguration complete message may indicate that the electronic device 101 uses the third radio resource.

In an exemplary embodiment, the base station 10 receiving the second RRC reconfiguration complete message from the electronic device 101 may determine that the electronic device 101 uses the third radio resource.

In an exemplary embodiment, the base station 10 may allocate the third radio resource to the electronic device 101 through RRC connection reconfiguration of operation 870. In an exemplary embodiment, the electronic device 101 may be configured to use the third radio resource according to the RRC connection reconfiguration of operation 870.

In an exemplary embodiment, in operation 870, the electronic device 101 may transmit a second RRC reconfiguration complete message to the base station 10 in response to identifying that the overheating of the electronic device 101 has been relieved.

Figure 9:
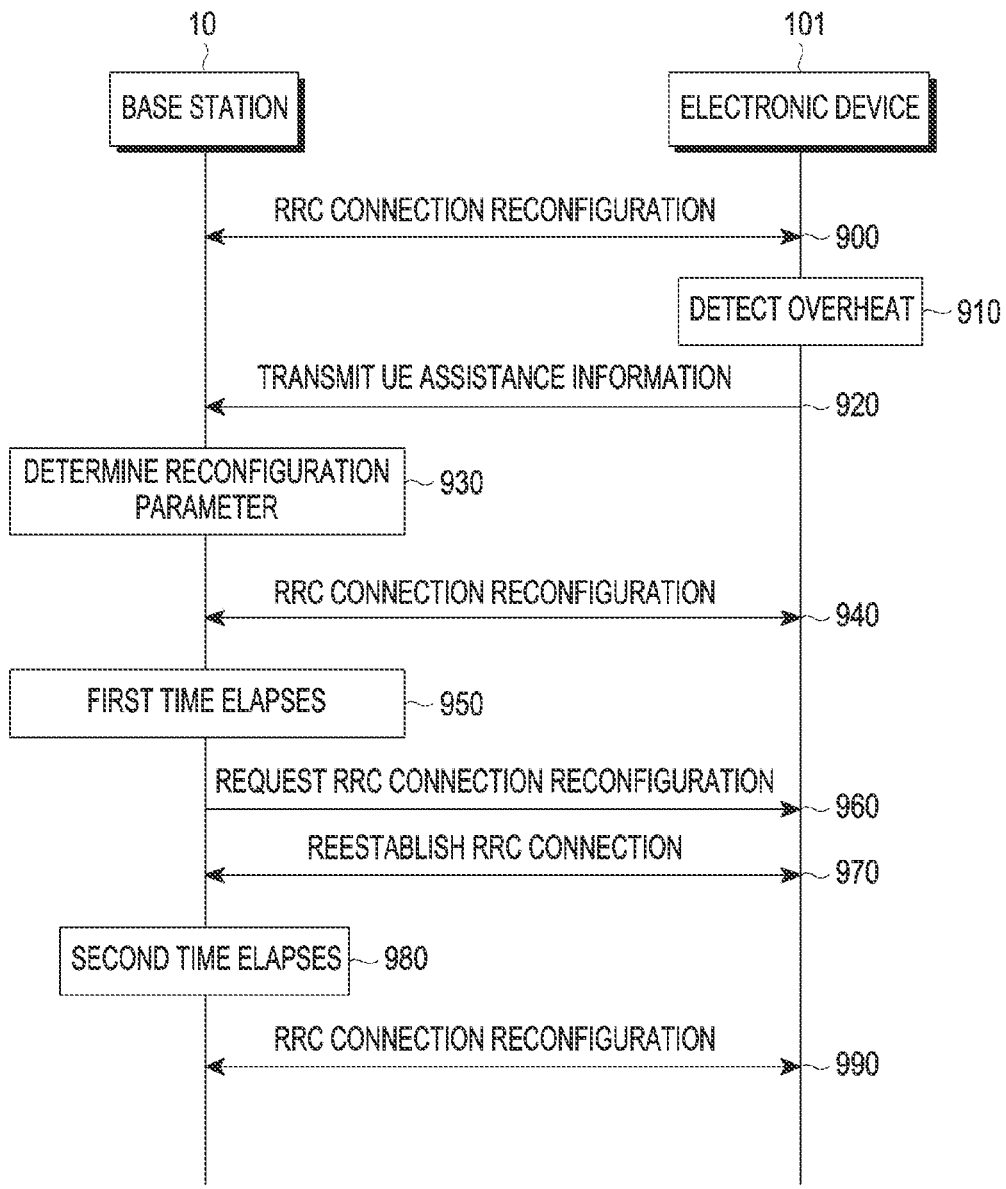
FIG. 9 is a view illustrating an example of transmission/reception of signals between an electronic device and a base station according to various embodiments of the present invention.

FIG. 9 is a view illustrating an example of transmission/reception of signals between an electronic device and a base station according to various embodiments of the present invention. Some (operations 900 to 950) of the operations (operations 900 to 990) illustrated in FIG. 9 are the same as operations (operations 600 to 650) illustrated in FIG. 6. That is, operations 900, 910, 920, 930, 940, and 950 in FIG. 9 may respectively correspond to operations 600, 610, 620, 630, 640, and 650 in FIG. 6. Accordingly, a detailed description of the same operations as those in FIG. 6 among the operations in FIG. 9 will be omitted.

Referring to FIG. 9, when the base station 10 according to various embodiments identifies that the first time elapses in operation 950 (corresponding to operation 650 in FIG. 6), the base station 10 may transmit, to the electronic device 101, a second RRC connection reconfiguration message for configuring an RRC connection with the electronic device 101 (e.g., at least one of the processor 120 or at least one communication processor 212 or 214) in operation 960. For example, the second RRC connection reconfiguration message may include information on the third radio resource allocated to the electronic device 101.

In an exemplary embodiment, in operation 970, the electronic device 101 may transmit an RRC connection reestablishment request message to the base station 10 in response to the received second RRC connection reconfiguration message. For example, the RRC connection reestablishment request message may include information on the second radio resource.

In an exemplary embodiment, the base station 10 receiving the RRC connection reestablishment request message from the electronic device 101 may transmit an RRC connection reestablishment complete message for allocating a second radio resource to the electronic device 101 to the electronic device 101.

In an exemplary embodiment, the base station 10 may allocate the second radio resource allocated to the electronic device 101 through the RRC connection reconfiguration of operation 940 by the electronic device 101, as it, through the RRC connection reestablishment of operation 970. In an exemplary embodiment, the electronic device 101 may be configured to use the second radio resource allocated to the electronic device 101 through RRC connection reconfiguration of operation 940, as it is, through RRC connection reestablishment of operation 970.

In an exemplary embodiment, in operation 970, the electronic device 101 may transmit an RRC connection reestablishment request message to the base station 10 in response to identifying that the overheating of the electronic device 101 has not been relieved.

According to various embodiments, the base station 10 and the electronic device 101 may reconfigure (RRC reconfiguration) a radio resource control (RRC) connection, in operation 990 which is the second time point when the second time has elapsed (operation 980). For example, the base station 10 may allocate a third radio resource to the electronic device 101 through the RRC connection reconfiguration of operation 990. For example, the electronic device 101 may be configured to use the third radio resource according to the RRC connection reconfiguration of operation 990.

In an exemplary embodiment, in operation 990, the base station 10 may transmit a third RRC connection reconfiguration message to the electronic device 101. For example, the third RRC connection reconfiguration message may include information on the third radio resource allocated to the electronic device 101. In an exemplary embodiment, in operation 990, the electronic device 101 may transmit a third RRC reconfiguration complete message to the base station 10 in response to the received third RRC connection reconfiguration message. For example, the third RRC reconfiguration complete message may include information on the third radio resource.

In an exemplary embodiment, the start time of the second time in operation 980 may be a time point in time when the base station 10 transmits a second RRC connection reconfiguration message for establishing an RRC connection to the electronic device 101 in operation 960. In an exemplary embodiment, the start time of the second time in operation 980 may be a time point when the base station 10 receives the RRC connection reconfiguration message in response to the second RRC connection reestablishment message from the electronic device 101 in operation 970.

In an exemplary embodiment, the second time in operation 980 may be determined considering a cooling method of the electronic device 101. For example, the cooling method of the electronic device 101 may include an air cooling type, a water cooling type, and a fan type.

In an exemplary embodiment, the second time in operation 980 may be determined considering the type of the electronic device 101. In an exemplary embodiment, the time required for the electronic device 101 to relieve overheating may vary according to the type of the electronic device 101. For example, the types of the electronic device 101 may include a smartphone, a tablet, a PC, and a CPE. For example, for the electronic device 101 of the same type, the second time of operation 980 may be determined to differ according to the terminal model or the terminal manufacturer.

In an exemplary embodiment, the second time in operation 980 may be determined to differ according to the first radio resource used by the electronic device 101. In an exemplary embodiment, the time required for the electronic device 101 to relieve overheating may vary according to the first radio resource used by the electronic device 101. For example, the second time in operation 980 may be determined to differ according to the frequency corresponding to the first radio resource used by the electronic device 101. For example, the second time in operation 980 may be determined to differ according to the bandwidth corresponding to the first radio resource used by the electronic device 101. For example, the second time in operation 980 may be determined to differ according to the number of carriers corresponding to the first radio resource used by the electronic device 101.

In an exemplary embodiment, the second time in operation 980 may be determined to differ according to the second radio resource used by the electronic device 101. In an exemplary embodiment, the time required for the electronic device 101 to relieve overheating may vary according to the second radio resource used by the electronic device 101. For example, the second time in operation 980 may be determined to differ according to the frequency corresponding to the second radio resource used by the electronic device 101. For example, the second time in operation 980 may be determined to differ according to the bandwidth corresponding to the second radio resource used by the electronic device 101. For example, the second time in operation 980 may be determined to differ according to the number of carriers corresponding to the second radio resource used by the electronic device 101.

Figure 10:
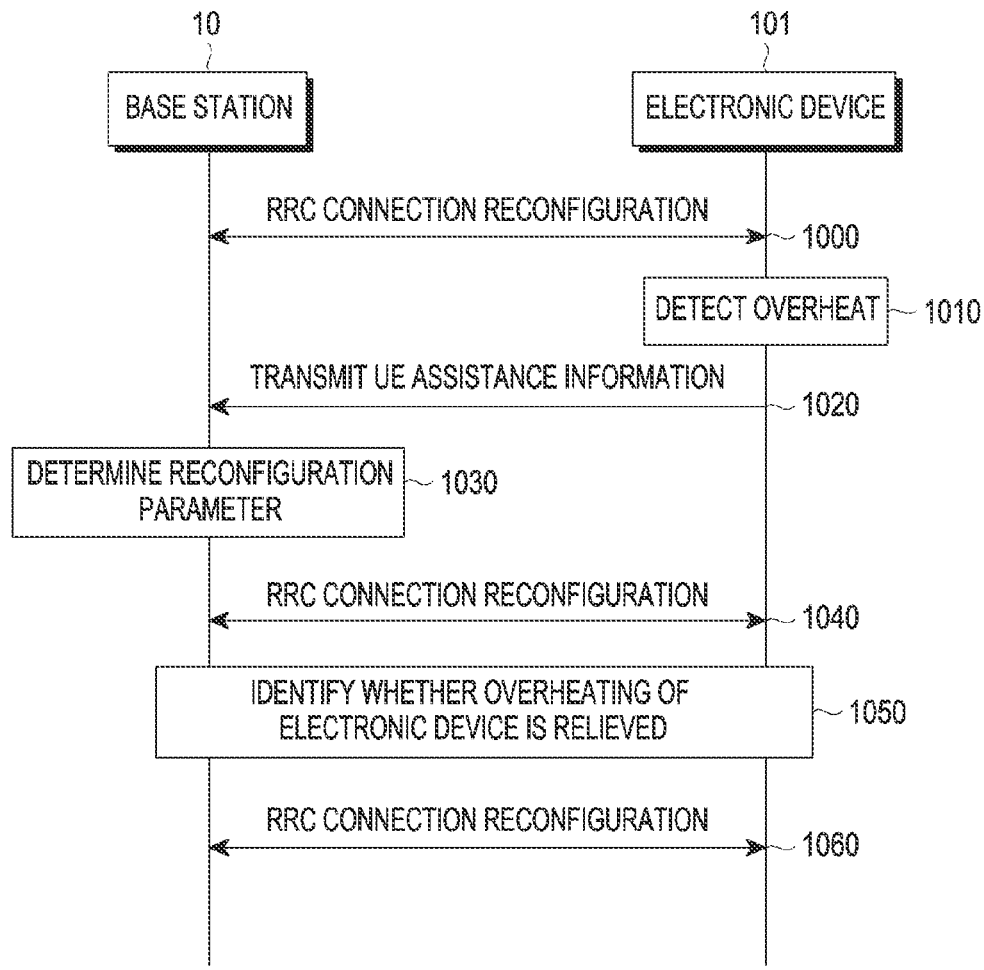
FIG. 10 is a view illustrating an example of transmission/reception of signals between an electronic device and a base station according to various embodiments of the present invention.

FIG. 10 is a view illustrating an example of transmission/reception of signals between an electronic device and a base station according to various embodiments of the present invention. Some (operations 1000 to 1040) of the operations (operations 1000 to 1060) illustrated in FIG. 10 are the same as operations (operations 600 to 640) illustrated in FIG. 6.

That is, operations 1000, 1010, 1020, 1030, and 1040 in FIG. 10 may respectively correspond to operations 600, 610, 620, 630, and 640 in FIG. 6. Accordingly, a detailed description of the same operations as those in FIG. 6 among the operations in FIG. 10 will be omitted.

Referring to FIG. 10, the base station 10 according to various embodiments reconfigures (RRC reconfiguration) a radio resource control (RRC) connection with the electronic device 101 in operation 1040 (corresponding to operation 640 in FIG. 6) and, then, in operation 1050, transmit a message for requesting information on whether the overheating of the electronic device 101 (e.g., at least one of the processor 120 or at least one communication processor 212 or 214) is relieved to the electronic device 101. In an exemplary embodiment, in operation 1050, the base station 10 may receive a second RRC reconfiguration complete message from the electronic device 101. For example, the second RRC reconfiguration complete message may include information indicating that the overheating of the electronic device 101 has been relieved. In an exemplary embodiment, in operation 1050, the base station 10 may receive an RRC connection reestablishment request message from the electronic device 101. For example, the RRC connection reestablishment request message may include information indicating that overheating of the electronic device 101 has not been relieved.

In an exemplary embodiment, the message for requesting the information on whether the overheating of the electronic device 101 is relieved from the base station 10 to the electronic device 101 may be one of the RRC layer, MAC layer, and physical layer messages.

According to various embodiments, in operation 1060, the base station 10 may reconfigure an RRC connection with the electronic device 101. In an exemplary embodiment, when the base station 10 receives a second RRC reconfiguration complete message from the electronic device 10 in operation 1060, the base station 10 may reconfigure an RRC connection for allocating a third radio resource to the electronic device 101. In an exemplary embodiment, when the base station 10 receives an RRC connection reestablishment request message from the electronic device 10 in operation 1060, the base station 10 may transmit an RRC connection reestablishment complete message for allocating a second radio resource to the electronic device 101 to the electronic device 101.

Figure 11:
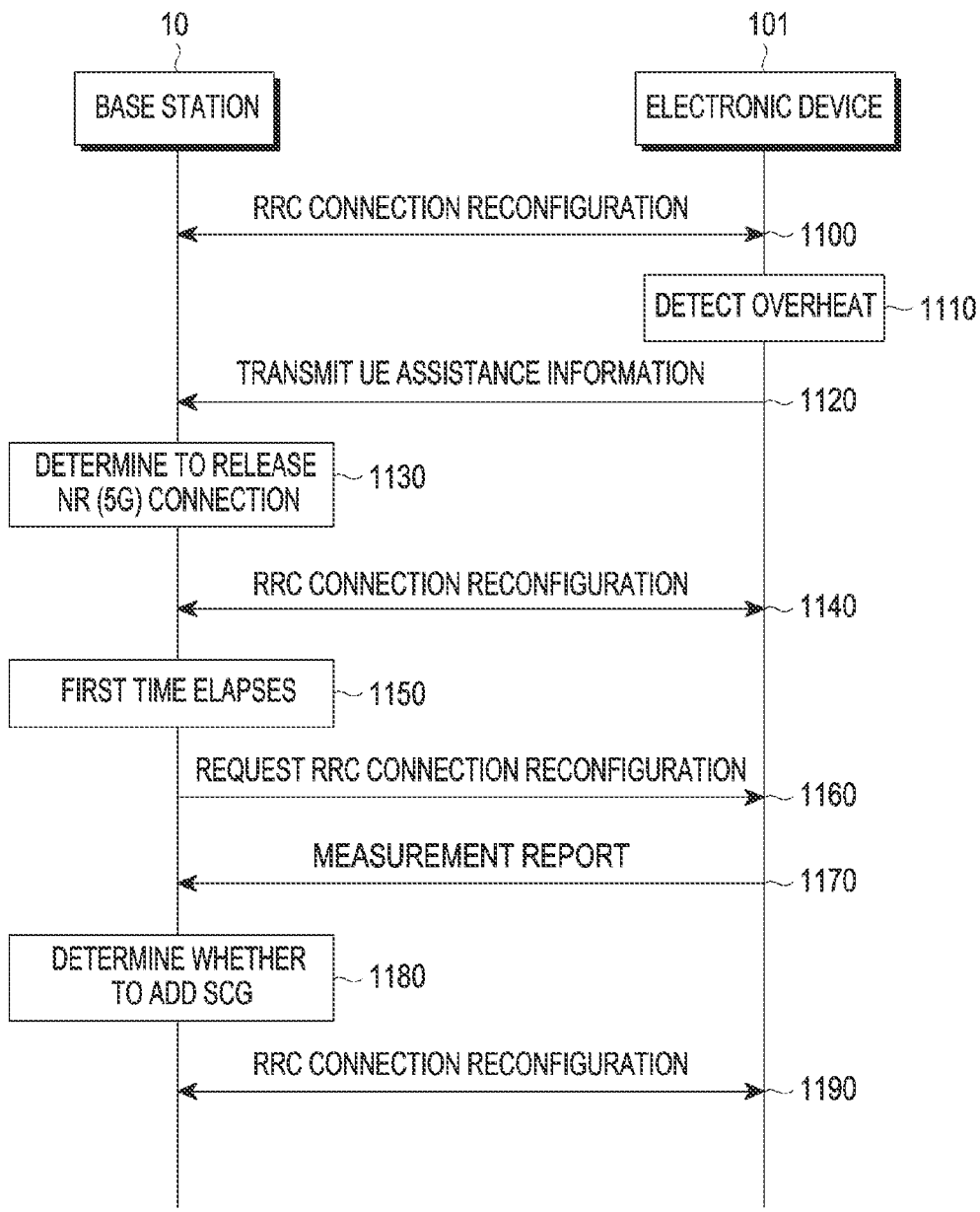
FIG. 11 is a view illustrating an example of transmission/reception of signals between an electronic device and a base station according to various embodiments of the present invention.

FIG. 11 is a view illustrating an example of transmission/reception of signals between an electronic device and a base station according to various embodiments of the present invention. Some (operations 1100 to 1120) of the operations (operations 1100 to 1190) illustrated in FIG. 11 are the same as operations (operations 600 to 620) illustrated in FIG. 6. That is, operations 1100, 1110, and 1120 in FIG. 11 may respectively correspond to operations 600, 610, and 620 in FIG. 6. Accordingly, a detailed description of the same operations as those in FIG. 6 among the operations in FIG. 11 will be omitted.

Referring to FIG. 11, the electronic device 101 according to various embodiments detects an occurrence of overheating in operation 1100 and transmit UE assistance information (UEAssistanceInformation) generated in response to detection of the overheating occurrence to the base station 10 in operation 1120.

According to various embodiments, after recognizing that overheating occurs in the electronic device 101 by the UE assistance information (UEAssistanceInformation) received from the electronic device 101, the base station 10 may determine to release the New Radio (NR, 5G) connection in operation 1130.

According to various embodiments, the base station 10 may recognize that an overheating might have occurred in the electronic device 101 by a radio link failure (RLF) report received from the electronic device 101 and may then determine to release the NR (5G) connection in operation 1130. For example, the electronic device 101 may transmit a radio link failure report indicating that the RRC connection has been released to the base station 10.

According to various embodiments, if the base station 10 determines to release the NR (5G) connection, the base station 10 may reconfigure a radio resource control (RRC) connection (RRC reconfiguration) with the electronic device 101 in operation 1140.

In an exemplary embodiment, in operation 1140, the base station 10 may transmit a first RRC connection reconfiguration message to the electronic device 101. For example, the first RRC connection reconfiguration message may include information on a Secondary Cell Group (SCG) release configuration. For example, the first RRC connection reconfiguration message may not include information on SCG measurement configuration.

In an exemplary embodiment, in operation 1140, the electronic device 101 may transmit a first RRC reconfiguration complete message to the base station 10 in response to the first RRC connection reconfiguration message. For example, the first RRC connection reconfiguration message may include information on the second radio resource allocated to the electronic device 101.

When the base station 10 according to various embodiments identifies that the first time elapses in operation 1150 (corresponding to operation 650 in FIG. 6), the base station 10 may transmit, to the electronic device 101, a second RRC connection reconfiguration message for configuring an RRC connection with the electronic device 101 (e.g., at least one of the processor 120 or at least one communication processor 212 or 214) in operation 1160. For example, the second RRC connection reconfiguration message may include information on SCG measurement configuration.

The electronic device 101 according to various embodiments may perform measurement based on information on the SCG measurement configuration included in the second RRC connection reconfiguration message in operation 1170, and report the result of measurement to the base station 10.

The base station 10 according to various embodiments may determine whether to add the SCG based on the measurement result reported from the electronic device 101 in operation 1180. For example, the base station 10 may determine whether to connect the NR (5G) based on the measurement result reported from the electronic device 101.

If the base station 10 according to various embodiments determines to add the SCG (e.g., determines to connect NR (5G)), the base station 10 may reconfigure (RRC reconfiguration) an RRC connection with the electronic device 101 in operation 1190.

In an exemplary embodiment, the base station 10 may transmit a third RRC connection reconfiguration message to the electronic device 101 in operation 1190. For example, the third RRC connection reconfiguration message may include information on SCG addition configuration.

In an exemplary embodiment, in operation 1190, the electronic device 101 may transmit a third RRC reconfiguration complete message to the base station 10 in response to the third RRC connection reconfiguration message. For example, the third RRC connection reconfiguration message may include information on the third radio resource allocated to the electronic device 101 for NR (5G) connection.

Figure 12:
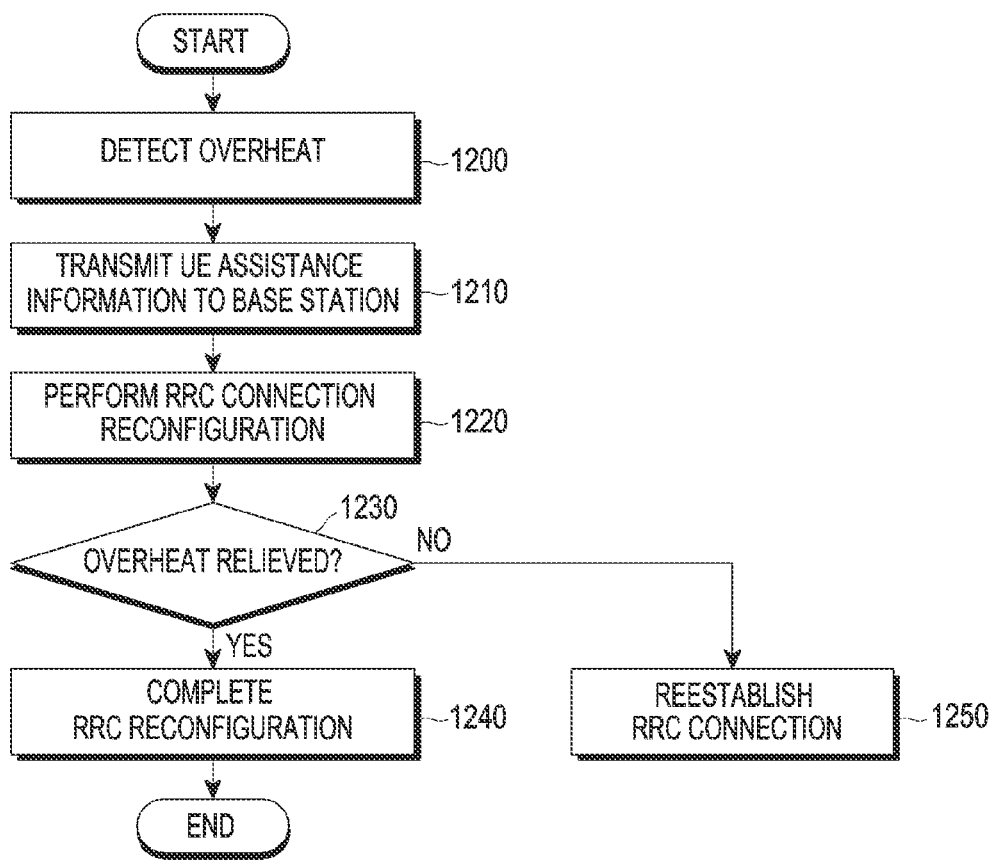
FIG. 12 is a flowchart illustrating operations of an electronic device according to various embodiments of the present invention.

FIG. 12 is a flowchart illustrating operations of an electronic device according to various embodiments of the present invention.

According to various embodiments, in operation 1200, the electronic device 101 (e.g., at least one of the processor 120 or at least one communication processor 212 or 214) may identify an overheating of the electronic device 101. For example, the electronic device 101 may generate UE assistance information (UEAssistanceInformation) in response to identifying the overheating of the electronic device 101. In an exemplary embodiment, the UE assistance information (UEAssistanceInformation) may include the capability of the electronic device 101 that the electronic device 101 may reduce.

According to various embodiments, in operation 1210, the electronic device 101 may transmit the UE assistance information (UEAssistanceInformation) generated in response to identifying the overheating of the electronic device 101 to the base station 10.

According to various embodiments, in operation 1220, the electronic device 101 and the base station 10 may reconfigure (RRC reconfiguration) a radio resource control (RRC) connection. For example, the electronic device 101 may receive a first RRC connection reconfiguration message from the base station 10. For example, the first RRC connection reconfiguration message may include information on the second radio resource allocated to the electronic device 101. For example, the electronic device 101 may be configured to use the second radio resource according to the RRC connection reconfiguration of operation 1220.

According to various embodiments, in operation 1230, the electronic device 101 may determine whether the overheating of the electronic device 101 is relieved. In an exemplary embodiment, the electronic device 101 may receive a second RRC connection reconfiguration message for establishing an RRC connection from the base station 10. For example, the second RRC connection reconfiguration message may include information on the third radio resource allocated to the electronic device 101. For example, the second RRC connection reconfiguration message may include information requesting to identify whether the overheating of the electronic device 101 is relieved.

According to various embodiments, when the electronic device 101 identifies that the overheating of the electronic device 101 has been relieved, the second RRC reconfiguration complete message may be transmitted to the base station 10 in operation 1240. For example, the second RRC reconfiguration complete message may include information on the third radio resource. In an exemplary embodiment, the electronic device 101 may be configured to use the third radio resource according to the RRC connection reconfiguration of operation 1240.

According to various embodiments, when the electronic device 101 identifies that the overheating of the electronic device 101 has not been relieved, the electronic device 101 may transmit an RRC connection reestablishment request message to the base station 10 in operation 1250. For example, the RRC connection reestablishment request message may include information on the second radio resource. In an exemplary embodiment, the electronic device 101 may be configured to use the second radio resource allocated to the electronic device 101 through RRC connection reconfiguration of operation 1220, as it is, through RRC connection reestablishment of operation 1250.

Figure 13:
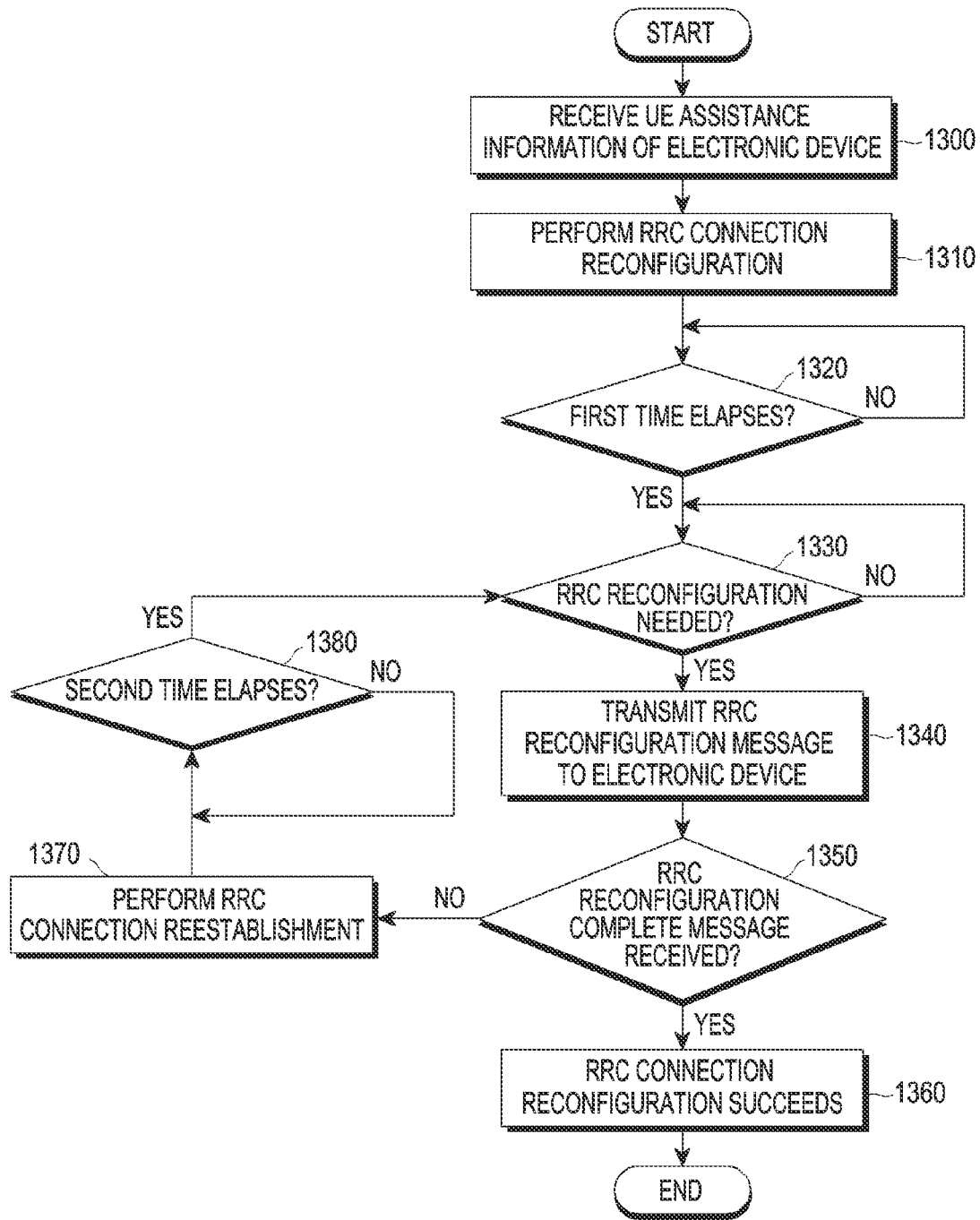
FIG. 13 is a flowchart illustrating operations of a base station according to various embodiments of the present invention.

FIG. 13 is a flowchart illustrating operations of a base station according to various embodiments of the present invention.

According to various embodiments, in operation 1300, the base station 10 may receive, from the electronic device 101, UE assistance information (UEAssistanceInformation) generated in response to identifying an overheating of the electronic device 101 by the electronic device 101 (e.g., at least one of the processor 120 or at least one communication processor 212 or 214). In an exemplary embodiment, the base station 10 receiving the UE assistance information (UEAssistanceInformation) may determine whether to accept or ignore a request of the electronic device 101 corresponding to the UE assistance information (UEAssistanceInformation). In an exemplary embodiment, when the base station 10 accepts the request of the electronic device 101 corresponding to the UE assistance information (UEAssistanceInformation), the base station 10 may identify the UE assistance information (UEAssistanceInformation) and determine the reconfiguration parameter for the resource configured in the electronic device 101 with a second radio resource corresponding to the UE assistance information (UEAssistanceInformation).

According to various embodiments, in operation 1310, the base station 10 and the electronic device 101 may reconfigure (RRC reconfiguration) a radio resource control (RRC) connection. For example, the base station 10 may allocate a second radio resource to the electronic device 101 through the RRC connection reconfiguration of operation 1310.

In an exemplary embodiment, in operation 1310, the base station 10 may transmit a first RRC connection reconfiguration message to the electronic device 101. For example, the first RRC connection reconfiguration message may include information on the second radio resource allocated to the electronic device 101. In an exemplary embodiment, when the base station 10 receives the first RRC reconfiguration complete message from the electronic device 101 in response to the first RRC connection reconfiguration message, the base station 10 may determine that the electronic device 101 uses the second radio resource.

According to various embodiments, in operation 1320, the base station 10 may determine whether the first time point after the first time has elapsed has arrived.

According to various embodiments, when the base station 10 identifies that the first time point after the first time has elapsed has arrived, it may be determined whether it is necessary to reconfigure an RRC connection between the base station 10 and the electronic device 101 in operation 1330. In an exemplary embodiment, the base station 10 may allocate the third radio resource to the electronic device 101 through RRC connection reconfiguration.

According to various embodiments, when the base station 10 identifies that the first time point after the first time has elapsed has not arrived, a determination as to whether RRC connection reconfiguration between the base station 10 and the electronic device 101 is needed may be put on hold until the first time point arrives.

According to various embodiments, in operation 1330, when the base station 10 determines that RRC connection reconfiguration between the base station 10 and the electronic device 101 is required, the base station 10 may transmit a second RRC connection reconfiguration message to the electronic device 101 in operation 1340. For example, the second RRC connection reconfiguration message may include information on the third radio resource allocated to the electronic device 101.

According to various embodiments, in operation 1330, when the base station 10 identifies that RRC connection reconfiguration between the base station 10 and the electronic device 101 is not required, the base station 10 may put on hold transmitting the second RRC connection reconfiguration message to the electronic device 101.

According to various embodiments, in operation 1350, the base station 10 may identify whether a second RRC reconfiguration complete message is received from the electronic device 101 in response to the second RRC connection reconfiguration message.

According to various embodiments, in operation 1350, when the base station 10 identifies that the second RRC reconfiguration complete message is received from the electronic device 101 in response to the second RRC connection reconfiguration message, the base station 10 may determine to allocate a third radio resource to the electronic device 101 in operation 1360.

According to various embodiments, when the base station 10 identifies that the second RRC reconfiguration complete message is not received in response to the second RRC connection reconfiguration message from the electronic device 101 in operation 1350, the base station 10 may receive an RRC connection reestablishment request message in response to the second RRC connection reconfiguration message from the electronic device 101 in operation 1370. For example, the RRC connection reestablishment request message may include information on the second radio resource.

In an exemplary embodiment, the base station 10 receiving the RRC connection reestablishment request message from the electronic device 101 may transmit an RRC connection reestablishment complete message for allocating a second radio resource to the electronic device 101 to the electronic device 101 in operation 1370.

According to various embodiments, in operation 1380, the base station 10 may determine whether the second time point after the second time has elapsed has arrived.

According to various embodiments, when the base station 10 identifies that the second time point after the second time has elapsed has arrived in operation 1380, it may be determined whether it is necessary to reconfigure an RRC connection between the base station 10 and the electronic device 101 in operation 1330. In an exemplary embodiment, the base station 10 may allocate the third radio resource to the electronic device 101 through RRC connection reconfiguration.

According to various embodiments, when the base station 10 identifies that the second time point after the second time has elapsed has not arrived in operation 1380, a determination as to whether RRC connection reconfiguration between the base station 10 and the electronic device 101 is needed may be put on hold until the second time point arrives.

According to various embodiments, a method for controlling a radio resource for communication with an electronic device by a base station may comprise receiving an assistance information message related to an overheating of the electronic device (e.g., at least one of the processor 120 or at least one communication processor 212 or 214) using a first radio resource from the electronic device, transmitting, to the electronic device, a first radio resource control (RRC) connection reconfiguration message for allocating a second radio resource, which is reduced as compared with the first radio resource, to the electronic device in response to the assistance information message, receiving a first RRC reconfiguration complete message from the electronic device in response to the first RRC connection reconfiguration message, and transmitting, to the electronic device, a second RRC connection reconfiguration message for allocating a third radio resource, which is increased as compared with the second radio resource, to the electronic device at a first time point after receiving the first RRC reconfiguration complete message.

According to various embodiments, the first time point may be a time point that passes by a first time from a time point when the second radio resource allocated to the electronic device is determined or a time point when the assistance information message is received from the electronic device. According to various embodiments, the first time may be determined based on at least one of a cooling method of the electronic device, a type of the electronic device, a distance between the electronic device and the base station, a frequency corresponding to the first radio resource, a bandwidth corresponding to the first radio resource, and a number of carriers corresponding to the first radio resource.

According to various embodiments, the second radio resource may be determined based on information included in the assistance information message.

According to various embodiments, the method for controlling the radio resource for communication with the electronic device by the base station may comprise receiving, from the electronic device, a second RRC reconfiguration complete message indicating that overheating of the electronic device is relieved in response to the second RRC connection reconfiguration message. According to various embodiments, the second RRC reconfiguration complete message may indicate that the electronic device uses the third radio resource.

According to various embodiments, the method for controlling the radio resource for communication with the electronic device by the base station may comprise receiving, from the electronic device, an RRC connection reestablishment request message indicating that overheating of the electronic device is not relieved in response to the second RRC connection reconfiguration message, and transmitting, to the electronic device, an RRC connection reestablishment complete message for allocating the second radio resource to the electronic device in response to the RRC connection reestablishment request message.

According to various embodiments, the method for controlling the radio resource for communication with the electronic device by the base station may comprise transmitting, to the electronic device, a third RRC connection reconfiguration message for allocating the third radio resource to the electronic device at a second time point after transmission of the RRC connection reestablishment complete message.

According to various embodiments, the second time point may be a time point that passes by a second time from a time of transmission of the RRC connection reestablishment complete message to the electronic device. According to various embodiments, the second time may be determined based on at least one of a cooling method of the electronic device, a type of the electronic device, a distance between the electronic device and the base station, a frequency corresponding to the first radio resource, a bandwidth corresponding to the first radio resource, and a number of carriers corresponding to the first radio resource.

According to various embodiments, a method for communicating with a base station based on a radio resource by an electronic device may comprise transmitting an assistance information message related to an overheating of the electronic device (e.g., at least one of the processor 120 or at least one communication processor 212 or 214) using a first radio resource to the base station, receiving, from the base station, a first radio resource control (RRC) connection reconfiguration message related to a second radio resource reduced as compared with the first radio resource, transmitting a first RRC reconfiguration complete message to the base station in response to the first RRC connection reconfiguration message, and receiving, from the base station, a second RRC connection reconfiguration message related to a third radio resource increased as compared with the second radio resource.

According to various embodiments, the method for communication with the base station based on the radio resource by the electronic device may comprise transmitting, to the base station, a second RRC reconfiguration complete message indicating that overheating of the electronic device is relieved in response to the second RRC connection reconfiguration message. According to various embodiments, the second RRC reconfiguration complete message may indicate that the electronic device uses the third radio resource.

According to various embodiments, the method for communication with the base station based on the radio resource by the electronic device may comprise transmitting, to the base station, an RRC connection reestablishment request message indicating that overheating of the electronic device is not relieved in response to the second RRC connection reconfiguration message, receiving, from the base station, an RRC connection reestablishment complete message related to the second radio resource in response to the RRC connection reestablishment request message, and receiving, from the base station, a third RRC connection reconfiguration message related to the third radio resource after reception of the RRC connection reestablishment complete message.

According to various embodiments, a base station configured to control a radio resource for communication with an electronic device (e.g., at least one of the processor 120 or at least one communication processor 212 or 214) may comprise a transceiver and at least one processor connected with the transceiver. According to various embodiments, the at least one processor may be configured to receive an assistance information message related to an overheating of the electronic device using a first radio resource from the electronic device, transmit, to the electronic device, a first radio resource control (RRC) connection reconfiguration message for allocating a second radio resource, which is reduced as compared with the first radio resource, to the electronic device in response to the assistance information message, receive, from the electronic device, a first RRC reconfiguration complete message in response to the first RRC connection reconfiguration message, and transmit, to the electronic device, a second RRC connection reconfiguration message for allocating a third radio resource, which is increased as compared with the second radio resource, to the electronic device at a first time point after receiving the first RRC reconfiguration complete message.

According to various embodiments, the first time point may be a time point that passes by a first time from a time point when the second radio resource allocated to the electronic device is determined or a time point when the assistance information message is received from the electronic device. According to various embodiments, the first time may be determined based on at least one of a cooling method of the electronic device, a type of the electronic device, a distance between the electronic device and the base station, a frequency corresponding to the first radio resource, a bandwidth corresponding to the first radio resource, and a number of carriers corresponding to the first radio resource.

According to various embodiments, the second radio resource may be determined based on information included in the assistance information message.

According to various embodiments, the at least one processor may be configured to receive, from the electronic device, a second RRC reconfiguration complete message indicating that overheating of the electronic device is relieved in response to the second RRC connection reconfiguration message. According to various embodiments, the second RRC reconfiguration complete message may indicate that the electronic device uses the third radio resource.

According to various embodiments, the at least one processor may be configured to receive, from the electronic device, an RRC connection reestablishment request message indicating that overheating of the electronic device is not relieved in response to the second RRC connection reconfiguration message, and transmit, to the electronic device, an RRC connection reestablishment complete message for allocating the second radio resource to the electronic device in response to the RRC connection reestablishment request message.

According to various embodiments, the at least one processor may be configured to transmit, to the electronic device, a third RRC connection reconfiguration message for allocating the third radio resource to the electronic device at a second time point after transmission of the RRC connection reestablishment complete message.

According to various embodiments, the second time point may be a time point that passes by a second time from a time of transmission of the RRC connection reestablishment complete message to the electronic device. According to various embodiments, the second time may be determined based on at least one of a cooling method of the electronic device, a type of the electronic device, a distance between the electronic device and the base station, a frequency corresponding to the first radio resource, a bandwidth corresponding to the first radio resource, and a number of carriers corresponding to the first radio resource.

According to various embodiments, an electronic device (e.g., at least one of the processor 120 or at least one communication processor 212 or 214) configured to communicate with a base station based on a radio resource may comprise a transceiver and at least one processor connected with the transceiver. According to various embodiments, the at least one processor may be configured to transmit an assistance information message related to an overheating of the electronic device using a first radio resource to the base station, receive, from the base station, a first radio resource control (RRC) connection reconfiguration message related to a second radio resource reduced as compared with the first radio resource, transmit a first RRC reconfiguration complete message to the base station in response to the first RRC connection reconfiguration message, and receive, from the base station, a second RRC connection reconfiguration message related to a third radio resource increased as compared with the second radio resource.

According to various embodiments, the at least one processor may be configured to transmit, to the base station, a second RRC reconfiguration complete message indicating that overheating of the electronic device is relieved in response to the second RRC connection reconfiguration message. According to various embodiments, the second RRC reconfiguration complete message may indicate that the electronic device uses the third radio resource.

According to various embodiments, the at least one processor may be configured to transmit, to the base station, an RRC connection reestablishment request message indicating that overheating of the electronic device is not relieved in response to the second RRC connection reconfiguration message, receive, from the base station, an RRC connection reestablishment complete message related to the second radio resource in response to the RRC connection reestablishment request message, and receive, from the base station, a third RRC connection reconfiguration message related to the third radio resource after reception of the RRC connection reestablishment complete message.

Various embodiments as set forth herein may be implemented as software (e.g., the program) including one or more instructions that are stored in a storage medium (e.g., internal memory or external memory) that is readable by a machine (e.g., the electronic device 101). For example, a processor of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Example embodiments have been described above in connection with the drawings. Although the embodiments have been described with reference to specific terms, this is intended simply for describing the technical spirit of the disclosure and should not be interpreted as limiting the scope of the disclosure which is defined by the appended claims. It will be apparent to one of ordinary skill in the art that various changes may be made thereto without departing from the scope of the disclosure. Accordingly, the scope of the present invention should be determined by the technical spirit of the invention as claimed in the claims.

What is claimed is:

1. A portable communication device comprising:
   a wireless communication circuitry configured to support a cellular communication; and
   a processor operatively coupled with the wireless communication circuitry, the processor adapted to control the wireless communication circuitry to:
   perform, using a first radio resource, the cellular communication with a base station external to the portable communication device;
   transmit, to the base station, a first indication indicative of an overheating state of the portable communication device using the first radio resource for the cellular communication;
   receive, from the base station, a first radio resource control (RRC) connection reconfiguration message including a second indication indicative of a second radio resource decreased as compared with the first radio resource;
   transmit, to the base station, a first RRC reconfiguration complete message in response to the first RRC connection reconfiguration message;
   receive, from the base station, a second RRC connection reconfiguration message including a third indication indicative of a third radio resource increased as compared with the second radio resource; and
   transmit, to the base station, a second RRC reconfiguration complete message in response to the second RRC connection reconfiguration message to indicate that the third radio resource is to be used for the cellular communication.

2. The portable communication device of claim 1, wherein the processor is adapted to:
   use a first number of multi-input-multi-output (MIMO) layers as at least part of the first radio resource, and a second number of MIMO layers less than the first number as at least part of the second radio resource, for the cellular communication with the base station.

3. The portable communication device of claim 1, wherein the processor is adapted to:
   use a first number of carriers as at least part of the first radio resource, and a second number of carriers less than the first number as at least part of the second radio resource, for the cellular communication with the base station.

4. The portable communication device of claim 1, wherein the processor is adapted to:
   receive, from the base station, the second RRC connection reconfiguration message when a specified period of time has elapsed after transmitting the first RRC reconfiguration complete message.

5. The portable communication device of claim 1, wherein the processor is adapted to:
   transmit, to the base station, an RRC connection reestablishment request message when identifying that overheating of the portable communication device is not relieved, in response to the second RRC connection reconfiguration message; and
   receive, from the base station, an RRC connection reestablishment complete message related to the second radio resource in response to the RRC connection reestablishment request message.

6. A method of operating a portable communication device, the method comprising:
   performing, via wireless communication circuitry of the portable communication device, a cellular communication using a first radio resource with a base station external to the portable communication device;
   transmitting, via the wireless communication circuitry, to a base station, a first indication indicative of an overheating state of the portable communication device using the first radio resource for the cellular communication;
   receiving, from the base station, a first radio resource control (RRC) connection reconfiguration message including a second indication indicative of a second radio resource decreased as compared with the first radio resource;

transmitting, via the wireless communication circuitry, a first RRC reconfiguration complete message to the base station in response to the first RRC connection reconfiguration message;

receiving, from the base station, a second RRC connection reconfiguration message including a third indication indicative of a third radio resource increased as compared with the second radio resource; and transmitting, via the wireless communication circuitry, a second RRC reconfiguration complete message to the base station in response to the second RRC connection reconfiguration message to indicate that the third radio resource is to be used for the cellular communication.

7. The method of claim 6, further comprising:
using a first number of multi-input-multi-output (MIMO) layers as at least part of the first radio resource, and a second number of MIMO layers less than the first number as at least part of the second radio resource, for the cellular communication with the base station.

8. The method of claim 6, further comprising:
using a first number of carriers as at least part of the first radio resource, and a second number of carriers less than the first number as at least part of the second radio resource, for the cellular communication with the base station.

9. The method of claim 6, further comprising:
receiving, from the base station, the second RRC connection reconfiguration message when a specified period of time has elapsed after transmitting the first RRC reconfiguration complete message.

10. The method of claim 6, further comprising:
transmitting, to the base station, an RRC connection reestablishment request message when identifying that overheating of the portable communication device is not relieved, in response to the second RRC connection reconfiguration message; and receiving, from the base station, an RRC connection reestablishment complete message related to the second radio resource in response to the RRC connection reestablishment request message.

11. A base station comprising:
a wireless communication circuitry; and
a processor operatively coupled to the wireless communication circuitry, the processor adapted to control the wireless communication circuitry to:
  receive, from a portable communication device external, a first indication indicative of an overheating state of the portable communication device using a first radio resource for a cellular communication with the portable communication device;
  in response to the first indication, transmit, to the portable communication device, a first radio resource control (RRC) connection reconfiguration message including a second indication indicative of a second radio resource decreased as compared with the first radio resource;
  receive, from the portable communication device, a first RRC reconfiguration complete message in response to the first RRC connection reconfiguration message; and
  transmit, to the portable communication device, a second RRC connection reconfiguration message including a third indication indicative of a third radio resource increased as compared with the second radio resource such that the third radio resource is to be used by the portable communication device for the cellular communication.

12. The base station of claim 11, wherein the processor is adapted to:
perform the transmitting of the second RRC connection reconfiguration message in response to a specified period of time elapsing after the first RRC reconfiguration complete message is received.

13. The base station of claim 11, wherein the processor is adapted to:
receive, from the portable communication device, a second RRC reconfiguration complete message indicative of using of the third radio resource by the portable communication device for the cellular communication.

14. The base station of claim 11, wherein the processor is adapted to:
receive, from the portable communication device, an RRC connection reestablishment request message in response to the second RRC connection reconfiguration message.

15. The base station of claim 14, wherein the processor is adapted to:
transmit, to the portable communication device, an RRC connection reestablishment complete message related to the second radio resource in response to the RRC connection reestablishment request message.

16. A method of operating a base station, the method comprising:
receiving, from a portable communication device external, a first indication indicative of an overheating state of the portable communication device using a first radio resource for a cellular communication with the portable communication device;

in response to the first indication, transmitting, to the portable communication device, a first radio resource control (RRC) connection reconfiguration message including a second indication indicative of a second radio resource decreased as compared with the first radio resource;

receiving, from the portable communication device, a first RRC reconfiguration complete message in response to the first RRC connection reconfiguration message; and transmitting, to the portable communication device, a second RRC connection reconfiguration message including a third indication indicative of a third radio resource increased as compared with the second radio resource such that the third radio resource is to be used by the portable communication device for the cellular communication.

17. The method of claim 16, further comprising:
performing the transmitting of the second RRC connection reconfiguration message in response to a specified period of time elapsing after the first RRC reconfiguration complete message is received.

18. The method of claim 16, further comprising:
receiving, from the portable communication device, a second RRC reconfiguration complete message indicative of using of the third radio resource by the portable communication device for the cellular communication.

19. The method of claim 16, further comprising:
receiving, from the portable communication device, an RRC connection reestablishment request message in response to the second RRC connection reconfiguration message.

20. The method of claim 19, further comprising:
transmitting, to the portable communication device, an RRC connection reestablishment complete message related to the second radio resource in response to the RRC connection reestablishment request message.

\* \* \* \* \*